US 8,655,766 B2

(12) United States Patent
Burns et al.

(10) Patent No.: US 8,655,766 B2
(45) Date of Patent: *Feb. 18, 2014

(54) SYSTEM AND METHOD FOR FACILITATING TRADING OF MULTIPLE TRADEABLE OBJECTS IN AN ELECTRONIC TRADING ENVIRONMENT

(75) Inventors: Michael J. Burns, Chicago, IL (US); Robert A. West, Chicago, IL (US); Gerald J. O'Connor, Chicago, IL (US); Stephen J. Murphy, Oak Park, IL (US)

(73) Assignee: Trading Technologies International, Inc, Chicago, IL (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/825,677

(22) Filed: Jun. 29, 2010

(65) Prior Publication Data
US 2010/0268637 A1 Oct. 21, 2010

Related U.S. Application Data

(63) Continuation of application No. 12/349,015, filed on Jan. 6, 2009, now Pat. No. 7,774,267, which is a continuation of application No. 10/954,682, filed on Sep. 30, 2004, now Pat. No. 7,523,064, which is a continuation-in-part of application No. 10/293,585, filed on Nov. 13, 2002, now Pat. No. 7,418,422.

(51) Int. Cl.
*G06Q 40/00* (2012.01)
*G06Q 40/04* (2012.01)
(52) U.S. Cl.
CPC ....................................... *G06Q 40/04* (2013.01)
USPC ........................................................... 705/37

(58) Field of Classification Search
CPC ....................................................... G06Q 40/04
USPC ............................................................ 705/37
See application file for complete search history.

(56) References Cited

U.S. PATENT DOCUMENTS 4,412,287 A 10/1983 Braddock, III
4,674,044 A 6/1987 Kalmus et al.
(Continued)

FOREIGN PATENT DOCUMENTS

EP 1067471 1/2001
WO 91/14231 9/1991
(Continued)

OTHER PUBLICATIONS

APT Brochure, LIFFE Exchange, circa 1990*.
(Continued)

*Primary Examiner* — Eric T Wong
(74) *Attorney, Agent, or Firm* — McDonnell Boehnen Hulbert & Berghoff LLP

(57) ABSTRACT

A system and method are provided for trading multiple tradeable objects. One example method includes displaying at least one combined quantity indicator representing a combined quantity associated with at least two tradeable objects, detecting an input associated with an order for a predetermined order quantity in relation to one of the combined quantity indicators, and allocating the order quantity between the at least two tradeable objects using at least one quantity allocation rule. In one example embodiment, a plurality of quantity allocation rules can be user-configurable, and different rules can be defined and applied in relation to different order types.

17 Claims, 18 Drawing Sheets

(56) References Cited

U.S. PATENT DOCUMENTS

| | | |
|---|---|---|
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,689,651 A | 11/1997 | Lozman |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,845,266 A | 12/1998 | Lupien et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,667 A | 8/1999 | Tull, Jr. et al. |
| 5,963,923 A | 10/1999 | Garber |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,408,282 B1 | 6/2002 | Buist |
| 6,697,099 B2 | 2/2004 | Smith et al. |
| 6,766,304 B2 | 7/2004 | Kemp, II et al. |
| 6,772,132 B1 | 8/2004 | Kemp, II et al. |
| 6,856,967 B1 | 2/2005 | Woolston et al. |
| 6,938,011 B1 | 8/2005 | Kemp, II et al. |
| 7,127,424 B2 | 10/2006 | Kemp, II et al. |
| 7,181,424 B1 | 2/2007 | Ketchum et al. |
| 7,243,083 B2 | 7/2007 | Burns et al. |
| 7,389,268 B1 | 6/2008 | Kemp, II et al. |
| 7,418,422 B2 | 8/2008 | Burns |
| 7,512,561 B2* | 3/2009 | Burns ............................ 705/37 |
| 7,523,064 B2* | 4/2009 | Burns et al. .................... 705/37 |
| 7,571,134 B1 | 8/2009 | Burns et al. |
| 7,577,602 B2 | 8/2009 | Singer |
| 7,627,519 B2* | 12/2009 | Burns ............................ 705/37 |
| 7,765,134 B1 | 7/2010 | Pazner |
| 7,774,267 B2* | 8/2010 | Burns et al. .................... 705/37 |
| 8,015,100 B2* | 9/2011 | Burns ............................ 705/37 |
| 8,321,331 B2 | 11/2012 | Burns |
| 8,332,304 B2 | 12/2012 | Burns et al. |
| 2001/0042040 A1 | 11/2001 | Keith |
| 2002/0023038 A1 | 2/2002 | Fritsch et al. |
| 2002/0035534 A1 | 3/2002 | Buist et al. |
| 2002/0055899 A1 | 5/2002 | Williams |
| 2002/0059129 A1 | 5/2002 | Kemp et al. |
| 2002/0073017 A1 | 6/2002 | Robertson |
| 2002/0099644 A1 | 7/2002 | Kemp et al. |
| 2002/0103741 A1 | 8/2002 | Boies et al. |
| 2002/0138401 A1 | 9/2002 | Allen et al. |
| 2002/0184237 A1 | 12/2002 | McFeely |
| 2002/0194114 A1 | 12/2002 | Erdmier |
| 2003/0004852 A1* | 1/2003 | Burns ............................ 705/37 |
| 2003/0004853 A1 | 1/2003 | Ram et al. |
| 2003/0009411 A1 | 1/2003 | Ram et al. |
| 2003/0023542 A1 | 1/2003 | Kemp et al. |
| 2004/0093300 A1 | 5/2004 | Burns |
| 2005/0149428 A1* | 7/2005 | Gooch et al. .................... 705/37 |
| 2006/0015436 A1 | 1/2006 | Burns et al. |
| 2006/0259411 A1 | 11/2006 | Burns |
| 2006/0265322 A1 | 11/2006 | Burns |
| 2009/0043664 A1 | 2/2009 | Lutnick et al. |
| 2009/0119201 A1 | 5/2009 | Burns et al. |
| 2009/0240617 A1 | 9/2009 | Burns et al. |
| 2010/0036766 A1 | 2/2010 | Burns |
| 2011/0282777 A1 | 11/2011 | Burns |
| 2013/0054442 A1 | 2/2013 | Burns et al. |
| 2013/0054443 A1 | 2/2013 | Burns et al. |

FOREIGN PATENT DOCUMENTS

| | | |
|---|---|---|
| WO | 95/06918 | 3/1995 |
| WO | 95/26005 | 9/1995 |
| WO | 98/49639 | 5/1998 |
| WO | 99/19821 | 4/1999 |
| WO | 99/30259 | 6/1999 |
| WO | 99/53424 | 10/1999 |
| WO | 00/52619 | 9/2000 |
| WO | 00/62187 | 10/2000 |
| WO | 00/65510 | 11/2000 |
| WO | 01/08057 | 2/2001 |
| WO | 01/16830 | 3/2001 |
| WO | 01/16852 | 3/2001 |
| WO | 01/22315 | 3/2001 |
| WO | 01/65403 | 9/2001 |
| WO | WO-01/75733 A1 | 10/2001 |
| WO | 01/88808 | 11/2001 |
| WO | 02/015461 | 2/2002 |
| WO | 02/29686 | 4/2002 |
| WO | 02/48945 | 6/2002 |
| WO | 02/59815 | 8/2002 |
| WO | 02/69226 | 9/2002 |
| WO | 02/79940 | 10/2002 |
| WO | 02/93325 | 11/2002 |
| WO | 02/99599 | 12/2002 |
| WO | 02/103601 | 12/2002 |
| WO | 03/090032 | 10/2003 |

OTHER PUBLICATIONS

Aurora Article, CBOT, circa 1989*.
CATS Traders' Manual, Toronto Stock Exchange, Sep. 30, 1977.
Cavaletti, Order Routing Article, Futures Magazine, Feb. 1997.
Declaration of Brendan Bradley in Case No. 04 C 5312, Nov. 18, 2004.
Globex Report: An update on the CME Global electronic exchange, Feb. 10, 1989.
Expanding futures and options trading around the world, around the clock, GLOBEX, circa 1989*.
Grummer, Peake, Sellers, Preliminary Feasibility Study, Bermudex Ltd., Nov. 1980.
Hansell, The computer that ate Chicago, Institutional Investor, Feb. 1989.
International Search Report for PCT/US03/36042.
International Search Report for PCT/US05/33991.
Kharouf, A Trading Room with a View, Futures, 27, Nov. 11, 1998.
Lerman, David, Exchange Traded Funds and E-Mini Stock Index Futures, 2001, John Wiley and Sons, pp. 166-168, 286-288, accessed via Goggle Books <http://books.google.com>.
Market Watch, Trading Screen, date not available.
Memorandum Opinion Published Feb. 9, 2005, of Judge James B. Moran in Case No. 04 C 5312.
NYMEX Access Documents, New York Mercantile Exchange, Feb. 28, 1992.
One Click Trading Options, Trading Technologies, circa 1998.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Trading Screen, INTEX of Bermuda, circa 1984*.
Trading Screen, MEFF Exchange, circa 1990*.
Trading Screen, SWX Exchange, circa 1990*.
Trading Screen, TIFFE Exchange, circa 1989-1990.
www.tradingtechnologies.com/products/xtrade_full.html(viewed May 22, 2001) Jun. 9, 2000.
USPTO Presentation, NASDAQ, Nov. 8, 2001.

(56) References Cited

OTHER PUBLICATIONS

U.S. Appl. No. 10/403,374, filed Mar. 31, 2003.
Weber, Information Technology in the Major International Financial Markets, Apr. 7, 1993.
U.S. Appl. No. 13/190,954 to Burns et al., filed Jul. 26, 2011.
International Preliminary Report on Patentability of International Application No. PCT/US2005/033991, dated Apr. 3, 2007 (mailed Apr. 12, 2007).
U.S. Appl. No. 13/659,050, filed Oct. 24, 2012, Michael J. Burns.
U.S. Appl. No. 13/659,055, filed Oct. 24, 2012, Michael J. Burns.

* cited by examiner

FIG. 5

Setup Window 500

Group Information 502
- Name: Sep04 Eurodollar

Tradeable Object Information 504
- Tradeable Object #1
  - Name: CME-S: GE Sep04
  - Short Name: GE
- Tradeable Object #2
  - Name: LIFFEE-S:ED Sep04
  - Short Name: ED Quantity 506
- Maximum Q: 100
- Default Q: 10
- Right Click Q: 0

Joining 508
- ☒ Constant Percentage  #1 50%  #2 50%
- ☐ FPF (Account for Better Orders) #1 50%  #2 50%
- ☐ FPF (Account for Any Orders)  #1 50%  #2 50%
- ☐ FPF (Ignore Orders)  #1 50%  #2 50%

Lifting/Hitting 510
- ☐ FPF  #1 50%  #2 50%
- ☐ Optimize (Ignore Position)  #1 50%  #2 50%
- ☐ Constant Percentages  #1 50%  #2 50%

Quantity 512
- ☐ Multiplier
- ☐ Divider
- TO#1
- TO#2

Multiplier 514
- ☐ Multiplier
- ☐ Divider
- Price
- TO#1
- TO#2

Offsets 516
- ☒ Price
- ☐ Quantity

- ☒ Global
- ☐ Bid
- ☐ Ask

Price Interval 518

Apply

| ED | GE | Default | Default | GE | ED |
|---|---|---|---|---|---|
| 10 | | | | | 25 |
| | | 614B | | | |
| | 606A 604A 608A | | 608B 604B 606B | | |
| 10 ~624 | | | 610 | | |
| | | | 9790.5 ◄ | | |
| | | | 9790.0 | 10 | 5 | 5 |
| | | | 9789.5 | | |
| 10 ~626 | | | 9789.0 | 10 | 5 | 5 |
| | | | 9788.5 | | |
| | | | 9788.0 | 300 | 300 | |
| | 25 | 693 | 718 | 9787.5 | 456 | 456 | |
| | 1460 | 600 | 2060 | 9787.0 | 86 | 86 | |
| 628 | 500 | 446 | 946 | 9786.5 | 840 | 130 | 710 |
| 10 | 5 | 1595 | 1600 | 9786.0 | 3950 | 2675 | 1275 |
| | 284 | 199 | 483 | 9785.5 | | |
| | | | | 9785.0 | | |
| | | | | 9784.5 | | |
| | | | | 9784.0 ~612 | | |
| | | | | 9783.5 | | |
| | | | | 9783.0 | | |
| 630 | | | | 9782.5 | | |
| 10X20 | 10 | -20 | -10 | 9782.0 | | |
| | | | | 9781.5 ► | -10 | -20 | 10 |
| | | | | 602 | 620 616 618 |

632 — JOIN- Buy 5GE@9784 / 5ED@97.84

| 10 | ZN | FTNL | Default | FTNL | ZN |
|---|---|---|---|---|---|
|  |  |  | ▲ |  |  |
|  |  |  | 111250 |  |  |
|  |  |  | 111245 | 317 | 214 |
|  |  |  | 111240 | 344 | 224 |
|  |  |  | 111235 | 279 | 740 |
|  |  |  | 111230 | 406 | 282 |
| 20 |  |  | 111225 | 400 | 240 |
|  |  |  | 111220 | 394 | 422 |
|  |  |  | 111215 | 520 | 496 |
| 60 |  |  | 111210 | 516 | 1056 |
|  |  |  | 111205 | 583 | 1082 |
| 25 | 1033 | 237 | 111200 |  |  |
|  | 1097 | 559 | 111195 |  |  |
|  | 1039 | 433 | 111190 |  |  |
| 75 | 1160 | 488 | 111185 |  |  |
|  | 1134 | 401 | 111180 |  |  |
|  |  |  | 111175 |  |  |
|  |  |  | 111170 |  |  |
|  |  |  | 111165 |  |  |
|  |  |  | 111160 |  |  |
|  |  |  | ▶ |  |  |
| 100X80 | -20 | -10 |  | -10 | -20 |

LIFT- Buy 10FTNL/ 15ZN@111210

|  | ZB 1312 | FTBX 1308 | Default 1304 |  | 1302 | FTBX 1306 | ZB 1310 |
|---|---|---|---|---|---|---|---|
|  | 50 |  |  | 108095 | 47 | 47 |  |
|  |  |  |  | 108090 | 408 | 98 | 310 |
|  | 50 |  |  | 108085 | 50 | 50 |  |
|  |  |  |  | 108080 | 372 | 52 | 320 |
|  |  |  |  | 108075 | 54 | 54 |  |
|  | 50 |  |  | 108070 | 1374 | 97 | 1277 |
|  |  |  |  | 108065 | 47 | 47 |  |
|  | 50 |  |  | 108060 | 1218 | 63 | 1155 |
|  |  |  | 71 | 108055 | 158 | 158 |  |
|  | 250 |  | 105 | 108050 | 685 |  | 685 |
|  |  | 386 | 451 | 108045 | 250 | 250 |  |
|  |  | 65 | 42 | 108040 |  |  |  |
|  | 50 | 51 | 686 | 108035 |  |  |  |
|  |  | 53 | 53 | 108030 |  |  |  |
|  |  | 42 | 481 | 108025 |  |  |  |
|  | 439 | 42 | 38 | 108020 |  |  |  |
|  |  | 38 | 335 | 108015 |  |  |  |
|  | 275 | 60 |  | 108010 |  |  |  |
|  | 50X400 | −50 | −50 | 108005 | −50 |  | −50 |
| LIFT- Buy 50FTBX@108060 | | | | | | | |

| | 1410 | | | | | | | | | | |
|---|---|---|---|---|---|---|---|---|---|---|---|
| | | 47 | 50 | 54 | 47 | 158 | 250 | | | | |
| | 1402 | 154 | 458 | 426 | 1421 | 1276 | 935 | | | | |
| | 1412 | ◀ | 108100 | 108090 | 108080 | 108070 | 108060 | 108050 | 108040 | 108030 | 108020 | 108010 | 108000 | ▶ |
| | 1404 | | | | | 176 | 493 | 739 | 519 | 340 | |
| 1406 | | 33 | 54 | 81 | 68 | 64 | 51 | 71 | | | |

1400

| ZN | FTNL | Default | FTNL | ZN |
|---|---|---|---|---|
| 1608 | 1606 | 1604 | 1612 | 1614 |
|  |  | 111250 |  |  |
|  |  | 111245 |  |  |
|  |  | 111240 | 531 | 317 | 214 |
|  |  | 111235 | 568 | 344 | 224 |
|  |  | 111230 | 1019 | 279 | 740 |
|  |  | 111225 | 688 | 406 | 282 |
| 20 |  | 111220 | 640 | 400 | 240 |
|  |  | 111215 | 816 | 394 | 422 |
| 60 |  | 111210 | 1016 | 520 | 496 |
|  |  | 111205 | 1572 | 516 | 1056 |
|  |  | 111200 | 1665 | 583 | 1082 |
| 25 | 1033 | 237 | 1270 | 111195 | 582 |
|  | 1097 | 559 | 1656 | 111190 |  |
| 75 | 1039 | 433 | 1472 | 111185 |  |
|  | 1180 | 488 | 1668 | 111180 |  |
|  | 1334 | 401 | 1735 | 111175 |  |
|  | 718 | 412 | 1130 | 111170 |  |
|  | 978 | 435 | 1413 | 111165 |  |
| 100x80 | 65 | -45 | 20 | 111160 | 20 | -45 | 65 |

LIFT- Buy 10FTNL / 15 ZN@111210

FIG. 16

| Tradeable Object 1 | Tradeable Object 2 | Buy / Sell | Quantity | Price | Qty #1 | Qty #2 |
|---|---|---|---|---|---|---|
| 100% | 0% | Buy | 5 | 111195 | 0 | 5 |
| 100% | 0% | Buy | 50 | 111195 | 0 | 50 |
| 100% | 0% | Buy | 1,000 | 111195 | 418 | 582 |
| 100% | 0% | Buy | 2,000 | 111200 | 583 | 1417 |
| 100% | 0% | Buy | 3,000 | 111205 | 1099 | 1901 |
| 50% | 50% | Buy | 5 | 111195 | 0 | 5 |
| 50% | 50% | Buy | 50 | 111195 | 0 | 50 |
| 50% | 50% | Buy | 1,000 | 111195 | 209 | 791 |
| 50% | 50% | Buy | 2,000 | 111200 | 583 | 1417 |
| 50% | 50% | Buy | 3,000 | 111205 | 960 | 2040 |

FIG. 17

| Tradeable Object 1 | Tradeable Object 2 | Buy / Sell | Quantity | Price | Qty #1 | Qty #2 |
|---|---|---|---|---|---|---|
| 100% | 0% | Buy | 5 | 111195 | 0 | 5 |
| 100% | 0% | Buy | 50 | 111195 | 0 | 50 |
| 100% | 0% | Buy | 1,000 | 111195 | 418 | 582 |
| 100% | 0% | Buy | 2,000 | 111200 | 583 | 1417 |
| 100% | 0% | Buy | 3,000 | 111205 | 1099 | 1901 |
| 50% | 50% | Buy | 5 | 111195 | 0 | 5 |
| 50% | 50% | Buy | 50 | 111195 | 0 | 50 |
| 50% | 50% | Buy | 1,000 | 111195 | 209 | 791 |
| 50% | 50% | Buy | 2,000 | 111200 | 583 | 1417 |
| 50% | 50% | Buy | 3,000 | 111205 | 960 | 2040 |

| Tradeable Object 1 | Tradeable Object 2 | Buy / Sell | Quantity | Price | Qty #1 | Qty #2 |
|---|---|---|---|---|---|---|
| 100% | 0% | Buy | 5 | 111195 | 5 | 0 |
| 100% | 0% | Buy | 50 | 111195 | 50 | 0 |
| 100% | 0% | Buy | 1,000 | 111195 | 1,000 | 0 |
| 100% | 0% | Buy | 2,000 | 111200 | 2,000 | 0 |
| 100% | 0% | Buy | 3,000 | 111205 | 3,000 | 0 |
| 50% | 50% | Buy | 5 | 111195 | 3 | 2 |
| 50% | 50% | Buy | 50 | 111195 | 25 | 25 |
| 50% | 50% | Buy | 1,000 | 111195 | 500 | 500 |
| 50% | 50% | Buy | 2,000 | 111200 | 1,000 | 1,000 |
| 50% | 50% | Buy | 3,000 | 111205 | 1,500 | 1,500 |

FIG. 20

| Tradeable Object 1 | Tradeable Object 2 | Buy / Sell | Quantity | Price | Qty #1 | Qty #2 |
|---|---|---|---|---|---|---|
| 100% | 0% | Buy | 5 | 111190 | 5 | 0 |
| 100% | 0% | Buy | 50 | 111190 | 50 | 0 |
| 100% | 0% | Buy | 1,000 | 111190 | 1,000 | 0 |
| 100% | 0% | Buy | 2,000 | 111185 | 2,000 | 0 |
| 100% | 0% | Buy | 3,000 | 111185 | 3,000 | 0 |
| 50% | 50% | Buy | 5 | 111190 | 3 | 2 |
| 50% | 50% | Buy | 50 | 111190 | 25 | 25 |
| 50% | 50% | Buy | 1,000 | 111185 | 500 | 500 |
| 50% | 50% | Buy | 2,000 | 111185 | 1,000 | 1,000 |
| 50% | 50% | Buy | 3,000 | 111185 | 1,500 | 1,500 |

SYSTEM AND METHOD FOR FACILITATING TRADING OF MULTIPLE TRADEABLE OBJECTS IN AN ELECTRONIC TRADING ENVIRONMENT

CROSS REFERENCE TO RELATED APPLICATIONS

This application is a continuation of U.S. patent application Ser. No. 12/349,015, filed on Jan. 6, 2009, now U.S. Pat. No. 7,774,267, which is a continuation of U.S. patent application Ser. No. 10/954,682, filed on Sep. 30, 2004, now U.S. Pat. No. 7,523,064, which is a continuation-in-part of U.S. patent application Ser. No. 10/293,585, now U.S. Pat. No. 7,418,422, filed on Nov. 13, 2002.

TECHNICAL FIELD

The present invention relates generally to the electronic trading. More specifically, it relates to a system and method for trading multiple tradeable objects in an electronic trading environment.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

To profit in today's rapidly moving markets, traders must be able to react quickly and assimilate enormous amounts of data. For example, a trader may constantly have to review market data, world news, business news, and so on before making trades. Consequently, a skilled trader with the quickest software, the fastest communications, and the most sophisticated analysis can significantly improve the trader's own or the trader's firm's potential profits. The slightest advantage in speed or ability to assimilate information can generate significant returns in a fast moving market. Therefore, in today's fast and dynamically changing markets, a trader lacking those means may be at a disadvantage compared to other traders.

For certain trading strategies, traders may be interested in monitoring and participating in markets of two or more tradeable objects. Known trading applications have limited capabilities to address this interest. For example, market information for one tradeable object may be displayed in a trading interface in a first trading window and information related to a second tradeable object may be displayed in a second trading window. Another available alternative provides limited market information about a first tradeable object in one row of a table and market information about a second tradeable object in a different row of the table. A disadvantage of these known trading applications is that the trader who is interested in trading two or more tradeable objects at the same time must use his valuable time to try to discern the current relationship between the tradeable objects. Order entry is also complicated by the multiple windows.

It would therefore be desirable to have an improved apparatus, method, and interface for trading multiple tradeable objects.

BRIEF DESCRIPTION OF THE DRAWINGS

Example embodiments of the present invention are described herein with reference to the following drawings, in which:

FIG. 5 is a block diagram illustrating one example embodiment of a setup window for defining a plurality of parameters for a tradeable object combination according to one example embodiment;

FIG. 6 is a block diagram illustrating a graphical user interface for trading multiple tradeable objects and tradeable object combinations according to one example embodiment;

FIG. 9 illustrates two different example order type/quantity pads;

FIG. 12 is a block diagram illustrating a trading interface providing a split market information display type for trading a plurality of tradeable objects according to one example embodiment;

FIG. 13 is a block diagram illustrating an example trading interface for displaying market depth information for two tradeable objects being traded in different tick sizes;

FIG. 14 is a block diagram illustrating an example trading interface for displaying better than best quantities according to one example embodiment;

FIG. 16 is a block diagram illustrating a trading interface displaying market related information related to two tradeable objects;

FIG. 17 is a block diagram illustrating a table that includes a plurality of quantity allocation values determined for a plurality of lifting orders using optimization rules that ignore a trader's net position;

FIG. 18 is a block diagram illustrating a table that includes a plurality of quantity allocation examples for a number of lifting orders using optimization rules that take into account a trader's net position;

FIG. 19 is a block diagram illustrating a table that includes a plurality of quantity allocation examples for a number of lifting orders using constant percentage rules; and FIG. 20 illustrates an example table that includes a plurality of quantity allocation examples for a number of joining orders using constant percentage rules.

DETAILED DESCRIPTION

I. Overview

Figure 1:
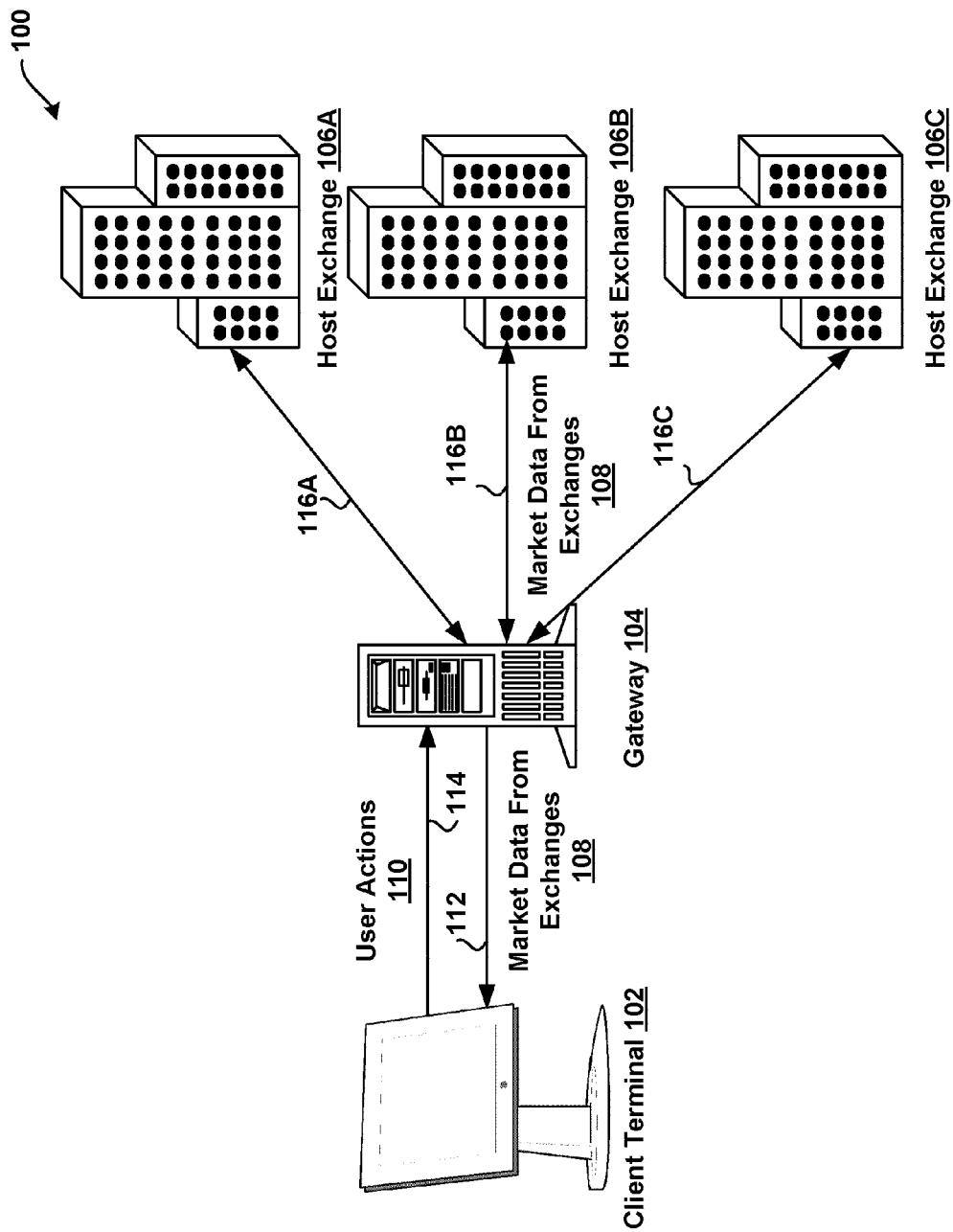
FIG. 1 is a block diagram illustrating an example network configuration for a communication system utilized to access one or more exchanges.

Trading tools are provided that allow a trader to implement a plurality of trading strategies in relation to multiple tradeable objects being offered at the same or different exchanges. In one example embodiment, a trading interface is provided that includes a plurality of regions that allow a trader to view market information and enter orders in relation to multiple tradeable objects. The plurality of regions may include a number of regions that display market information corresponding to each individual tradeable object, along with one or more regions that corresponds to combined market information associated with two or more the same or different tradeable objects. For example, the combined market information may include combined bid and ask values available at a certain price level for two or more tradeable objects. In one example embodiment, the regions may be displayed in relation to a common static price axis. To do that, prices corresponding to one or more tradeable objects can be normalized and/or shifted so that the market data corresponding to multiple tradeable objects can be displayed in relation to the common static price axis. In one example embodiment, a trader could define one or more multipliers and/or offsets to be used to in relation to price levels corresponding to each tradeable object to map them to a common price axis, and different offsets and multipliers could be used in relation to price levels corresponding to bid and ask quantities. In one embodiment, a trader could select the multipliers and/or offsets based on the trader's preferences, strategy, or trader-perceived relationship between the tradeable objects. The quantities corresponding to each individual tradeable object may then be mapped to locations in relation to the common axis of static prices.

The trading interfaces of the example embodiments can also be used by a trader to enter orders for one or more tradeable objects. In one example embodiment, a trader may define a number of quantity allocation rules so that when a trader enters an order via one of the combined market information regions, the rules can be used to allocate the entered quantity between the two or more tradeable objects corresponding to the combined market information region. For example, the rules could take a format of percentages, and the percentages could define how an entered quantity should be allocated to each tradeable object. The rules could be also dynamically changed based on any user-defined triggers, such as an unavailability of an exchange corresponding to a tradeable object to which a quantity is to be allocated. Different features associated with the example embodiments will be described in greater detail below.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when a trader selects a tradeable object, the trader may access market data related to the selected tradeable object(s). Referring to FIG. 1, an example communication that might occur between an electronic exchange and a client terminal in accordance with the preferred embodiments is shown. During a trading session, market data 108, in the form of messages, may be relayed from host exchanges 106A-106C over communication links 116A-C and 112 to a client terminal generally indicated as 102. As illustrated in FIG. 1, intermediate devices, such as gateway(s) 104, may be used to facilitate communications between the client terminal 102 and the host exchange 106. It should be understood that while FIG. 1 illustrates the host exchanges 106A-106C communicating with the client terminal 102 via a single gateway 104, more gateways could also be used. For example, each exchange could communicate with the client terminal 102 via a separate gateway, or multiple gateways could be assigned to each electronic exchange.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as a total traded quantity value for each price level, an opening price, a last traded price, a last traded quantity value, a closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client terminal 102, the embodiments of which will be described in relation to subsequent sections. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchanges 106, all of which may be considered various types of transaction information. Once generated, user action messages 110 may be sent from the client terminal 102 to the host exchange(s) over communication links 114 and 116A-116C.

III. System Function and Operation

Figure 2:
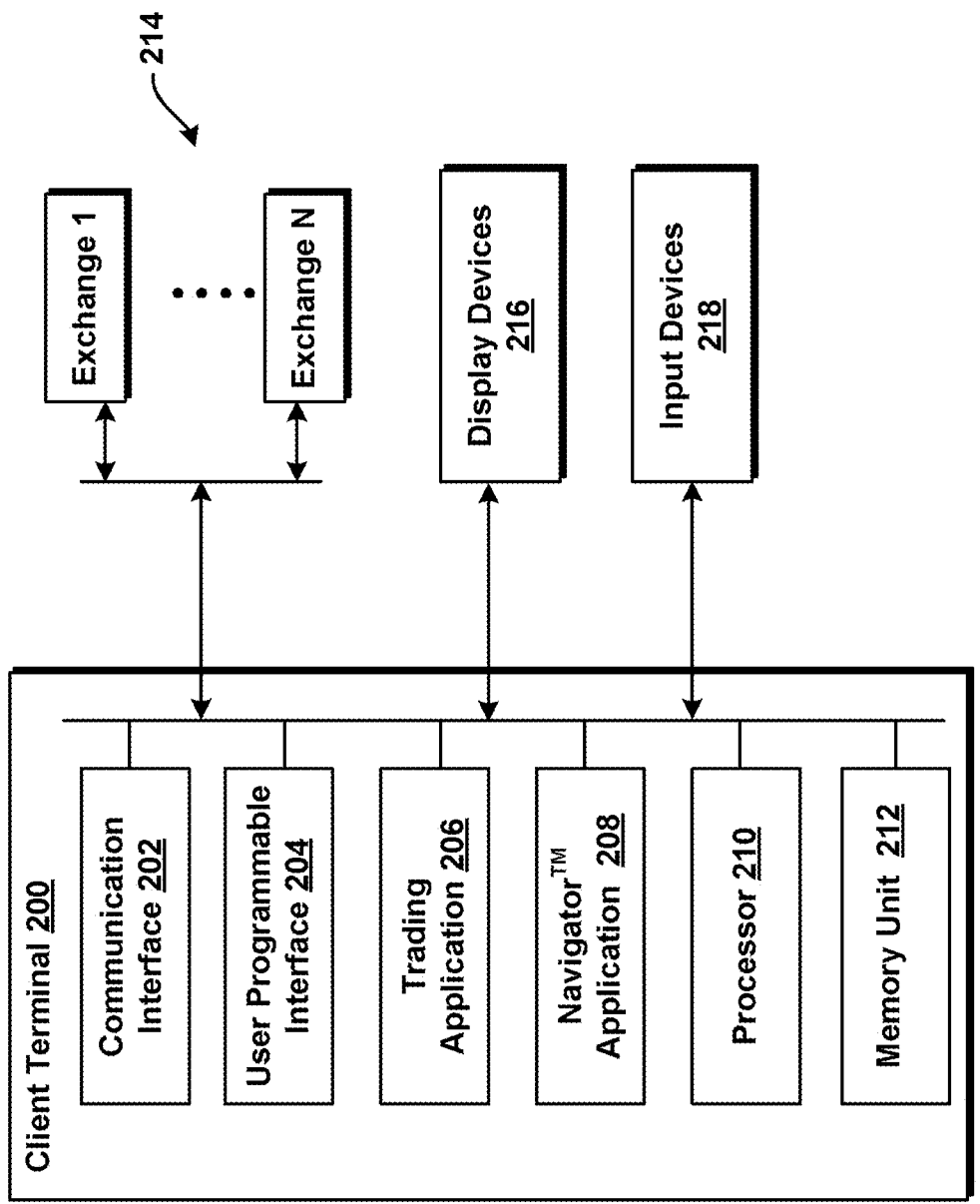
FIG. 2 is a block diagram illustrating a client terminal with a number of layers defining different stages that may be used to implement the example embodiments described herein.

FIG. 2 is a block diagram illustrating a client terminal 200 with a number of layers defining different stages that may be used to implement various example embodiments that will be described in greater detail below. The layers include a communication interface 202, a user programmable interface 204, a trading application 206, a Navigator™ application 208, a processor 210, and a memory unit 212.

The communication interface 202 allows the client terminal 200 to interact with the trader and to generate contents and characteristics of a trade order to be sent to one or more of a plurality of electronic exchanges 214. In one example embodiment, the user programmable interface 204 allows a user to enter any configuration parameters to be used by the Navigator™ application 208 or the trading application 206. The user programmable interface 204 may include any type of interface. For example, the user programmable interface 204 may be a command-driven interface, a graphical user interface that takes advantage of computer graphics, or the combination thereof. The graphical user interface may include one or more windows that can be moved around the display screen, and their size and shape can be changed as the user wishes. A window may in turn include icons that represent commands, files, or more windows. Alternatively, rather than using a user programmable interface at the client terminal, an intelligent communication interface could be used instead. In such an embodiment, a third party application could input one or more variables into the trading application 206 and the Navigator™ application 208, and the applications could operate based on those variables. The types of variables will be described in greater detail below.

In one embodiment, the user programmable interface 204 can be implemented in a software module or processor. The user programmable interface 204 can be a routine, a data structure, or the combination thereof, stored in the memory unit 212, and may perform the functions of the user programmable interface described herein.

As mentioned in an earlier paragraph, the user programmable interface 204 may take a format of different windows, which may be displayed via the display devices 212 of the client terminal 200, such as a screen of the client terminal 200. The windows can include as many functional icons as the user requests, and each icon may include an image displayed on the screen to represent an element that can be manipulated by the user.

Information being provided by the trading application 206 may be displayed to a trader via display devices 216, and may allow a trader to view market data, enter, cancel, change, and view trade orders. Preferably, the trading application 206 has access to market information from the host exchanges 214, and allows a trader to view market data, enter, change, and cancel orders, and view order related information. A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the present invention is not limited by the type of terminal or device used, and is not limited to any particular type of a trading application.

Portions of X_TRADER® and the MD Trader™-style display are described in U.S. Pat. No. 6,772,132, entitled "Click Based Trading With Intuitive Grid Display of Market Depth," filed on Jun. 9, 2000, U.S. patent application Ser. No. 09/971,087, now U.S. Pat. No. 7,127,424, entitled "Click Based Trading With Intuitive Grid Display of Market Depth and Price Consolidation," filed on Oct. 5, 2001, and U.S. patent application Ser. No. 10/125,894, now U.S. Pat. No. 7,389,268, entitled "Trading Tools for Electronic Trading," filed on Apr. 19, 2002, the contents of each are incorporated herein by reference.

In the embodiment illustrated in FIG. 2, the trading application 206 and the Navigator™ application 208 are shown as two separate applications. However, it should be understood that the functionality of both applications could be combined into one application as well. In one example embodiment, when a user activates the Navigator™ application 208, the trading application 206 may display a trading interface that shows bids and offers for two or more tradeable objects side by side, as well as a combined bid and ask column that can be used by a trader to submit orders using trader-defined quantity allocation rules, the embodiments of which will be described in greater detail below. The tradeable objects can be any tradeable objects selected by a trader. For example, the tradeable objects could be the same tradeable objects being offered at two different exchanges. However, a trader could select any unrelated tradeable objects as well.

A trader may then use the example trading interface to submit orders for one, or for more tradeable objects. If a trader enters an order using a region corresponding to a single tradeable object, the order to buy or sell the specified quantity will be sent to an exchange corresponding to that tradeable object. However, when an order is entered via a combined quantity region, the Navigator™ application 208 will first use quantity allocation rules to decide how the entered quantity should be allocated between two or more tradeable objects, and the order(s) will be sent to one or more exchanges corresponding to the tradeable objects. The quantity allocation decisions may be based on any user-configurable rules, and the rules can be static or dynamic. For example, the rules can dynamically change based on time of day or any other data being received from the exchanges. More examples related to order routing configuration and order submission using the example trading interfaces will be given below.

In one example embodiment, a trader could turn on the Navigator™ functionality by selecting a desktop icon displayed via the display devices 216. Alternatively, the Navigator™ application 208 can be automatically activated when a trader activates the trading application 206 and selects more than one tradeable object to be traded via the trading interface. Upon activating the Navigator™ application 208, the display devices 216 may display a configuration window, and a trader may use the window to configure a number of tradeable objects that the trader wishes to trade.

Figure 3:
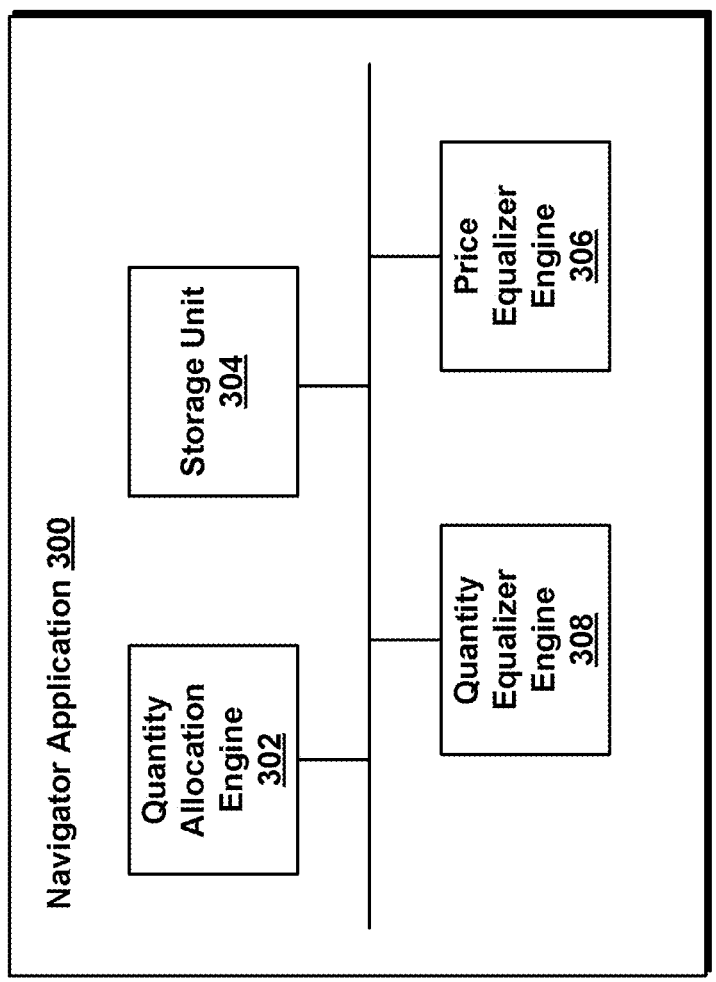
FIG. 3 is a block diagram illustrating an example Navigator™ application with a number of layers defining different stages that may be used to implement the embodiments described herein.

FIG. 3 is a block diagram illustrating an example Navigator™ application 300 with a number of layers defining different stages that may be used to implement the embodiments described herein. The layers include a quantity allocation engine 302, a storage unit 304, a price equalizer engine 306, and a quantity equalizer engine 308. In a preferred embodiment, the layers are accessible by a processor unit that preferably has enough processing power to handle and process various data and instructions associated with the layers.

In one example embodiment that will be described in greater detail below, a user may enter orders using a trading application that displays combined order quantity bid and ask regions. In such an embodiment, the quantity allocation engine 302 may allocate the entered quantity between the two or more tradeable objects corresponding to the combined quantity regions. The quantity allocation engine 302 may determine how the quantity should be allocated using a number of user-defined rules. The quantity allocation rules may include percentage values defining a percentage allocation value for each of the two or more tradeable objects. It should be understood that the quantity allocation rules could be dynamically modified upon detecting any user-defined conditions. For example, the conditions could be based on any tradeable object related data, exchange related data, trader related data, or the combination thereof. The user-defined quantity allocation rules can be stored in the storage unit 304. When the quantity allocation engine 302 determines how the entered quantity should be allocated, the Navigator™ application 208 may provide the allocation information to the trading application 206, and the trading application 206 may responsively submit one or more orders to the electronic exchange(s) 214.

The Navigator™ application 208 also includes the quantity equalizer engine 308 and the price equalizer engine 306. In general, quantities of some tradeable objects may be related such that buying a certain quantity of one tradeable object may be equivalent to buying a predetermined quantity of a second tradeable object. For example, buying or selling 3 lots of a first tradeable object may be considered by many traders to be equivalent to buying or selling 2 lots of a second tradeable object. Using the defined ratio, the quantities corresponding to the first and second tradeable objects can be equalized when they are displayed to a trader via a trading interface. For example, when the quantity equalizer engine 308 is configured to equalize quantities corresponding to the first tradeable object to quantities of the second tradeable object, and an order quantity of 10 is available for the first tradeable object at a specific price level, the price equalizer engine 308 may determine that the equalized quantity is 6.667. However, rather than displaying a fraction in relation to the price level, the quantity of 6 may be displayed instead. Similarly, when the quantity of 10 is available for the second tradeable object at a certain price level, and the quantity equalizer engine 308 equalizes the quantities of the second tradeable object to the quantities of the first tradeable object, based on the defined ratio, the quantity of 5 would be displayed for the second tradeable object in relation to that price level. In one example embodiment, the equalized quantities can be displayed in relation to a common price axis corresponding to the first tradeable object and the second tradeable object.

When a trader places an order via a trading interface that displays equalized quantities, the quantity equalizer engine 308 will modify an order quantity before the order is sent to an electronic exchange. Referring to the example given above, if a trader places an order to buy/sell 2 equalized lots of the first tradeable object, the quantity equalizer engine 308 will modify the order quantity based on the defined ratio so that the order having an order quantity of 6 will be sent to an electronic exchange (e.g., 2 equalized lots times 3 is 6). Similarly, when an order to buy/sell 3 lots of the second tradeable object is detected, the quantity equalizer engine 308 will modify the equalized order quantity based on the defined ratio, and an order having an order quantity of 6 will be sent to an electronic exchange (e.g., 3 equalized lots times 2 is 6). It should be understood that a trader could set up any ratios or formulas to be used by the quantity equalizer engine 308 to equalize quantity values of any two or more tradeable objects.

In some embodiments that will be described in greater detail below, if the same tradeable object is being traded at two different exchanges, the tradeable objects could be traded using the same price levels, and market information related to two or more tradeable objects can be displayed in relation to the same price axis. However, in other embodiments, a trader may wish to view, along a common price axis, market information related to two or more tradeable objects that could be traded using different price levels. According to one example embodiment, a trader may define multipliers as well as offsets to display market information along a common price axis. In addition to multipliers and offsets, a trader could also define a scaling price interval to be used in relation to the common price axis. In one embodiment, the scaling price interval could be a tick increment value to be used in relation to the common price axis. By default, the scaling price interval could be set to a tick increment value corresponding to a tradeable object that ticks in the smallest tradeable increments. For example, if one tradeable object ticks in half ticks, while a second tradeable object ticks in full ticks, the price equalizer engine 306 could select a scaling price interval of a half tick for a common price axis. However, it should be understood that the scaling price interval could be user-configurable. For example, if a first tradeable object ticks in 5 tick increments, while a second tradeable object ticks in 10 tick increments, a trader could select a tick increment of 10 to be used in relation to the common price axis. In such an embodiment, quantities occurring at 5 tick intervals can be rolled over to the lower or higher price level corresponding to the 10 tick intervals, and the selection of the higher or lower price level can be based on the user preferences.

As mentioned earlier, a trader could also define one or more multipliers to move prices corresponding to two or more tradeable object to the same price range. For example, one tradeable object may trade in a range of 9750.0 to 9780.0, while a second tradeable object may trade in a different price range of 97.60 to 97.95. In such an embodiment, to move the two tradeable objects to the same price range, a trader may decide to define a multiplier of 100 to move the prices of the second tradeable object to the price range of the first tradeable object. Alternatively, the prices corresponding to the first tradeable object could be divided by 100 (or multiplied by a fraction, such as 0.01, in this example) to move the price levels of the first tradeable object to the price range of the second tradeable object. It should be understood that two different multipliers could also be used to display market information corresponding to two tradeable objects in relation to a common price axis, so that one multiplier could be used in relation to the prices corresponding to the first tradeable object, and another multiplier could be used in relation to the prices corresponding to the second tradeable object. When a trader defines the multiplier values, the price equalizer engine 306 may use the defined multipliers to shift the prices corresponding to one or more tradeable objects to the same price range.

It should be understood that a multiplier value could be in a format of an integer, a fraction, or a decimal, and a trader could select the format that will be used in relation to the multiplier. However, alternatively, a multiplier value could be based on any user-defined formula. For example, a formula could be based on a trader's perception of a relationship between two or more tradeable objects' prices to be equalized. Also, a formula could include a number of variables that could be based on any market related data, or user defined values, and the formula could be linked to the Navigator application from any software application, such as Excel. In an alternative embodiment, rather that using a multiplier, a trader could also define a value that could be added to or subtracted from the prices corresponding to the tradeable objects so that the prices are in the same price range, or so that the quantities corresponding to two or more tradeable objects are displayed in relation to the common price axis according to the user's preferences.

In one embodiment, the equalizer engine 306 may constantly realign the markets based on the predefined multipliers and/or offsets. However, some traders, such as those traders who make their profits on a difference in prices corresponding to two or more tradeable objects, may not want to have the two markets constantly realigned. One example of this is basis trading. Generally, a basis is the difference between the futures price and the cash price. In one example embodiment, multipliers and/or offsets can be selected to reflect a user-defined basis value. Then, as the market forces drive the basis, (e.g., change the basis), a user may want to be able to see the relative positions of two or more markets corresponding to the tradeable objects in order to trade the basis, rather than having the market view being constantly realigned on the preset multipliers/offsets. In such an embodiment, however, a trader may want to have the markets realigned at some point, such as when the basis value is higher or lower than a user-predefined value. Rather than realigning the market view when the basis crosses a predefined value, a trader may wish to be notified of such an event. A trader may set up one or more alerts to be activated when the basis is out of a user-predefined range, and the alerts can take a format of visual and/or graphical alerts. In such an embodiment, when an alert is activated, a trader may be given a choice of either realigning the markets based on the predefined multipliers and/or offsets, or leaving the markets' view unchanged.

When the prices are equalized using a multiplier value, a trader may further modify the display of quantities in relation to the common price axis by defining one or more offsets that could be used to position two or more market depths in a certain relation to each other. Such an embodiment is especially beneficial when a trader has a certain perception about two or more markets, and wants to implement his/her trading strategy based on a relative position of the two markets in relation to each other. For example, a trader may define an offset to align two or more markets. It should be understood that different offsets could be used to align bids and asks. For example, one or more offsets could be used to align the best bids corresponding to two or more tradeable objects, and a different offset(s) could be used to align the best asks corresponding to two or more tradeable objects. For example, different offsets could be used to account for how much it costs to get in and out of the position. It should be understood that the offsets that are used by the price equalizer engine 306 may depend on a trader's trading strategy or preferences as to how the trader wants to see market information corresponding to two or more tradeable objects. Also, similarly to the multipliers, the offsets could be linkable to the Excel application that could control the offset values being applied to the market prices.

Figure 4:
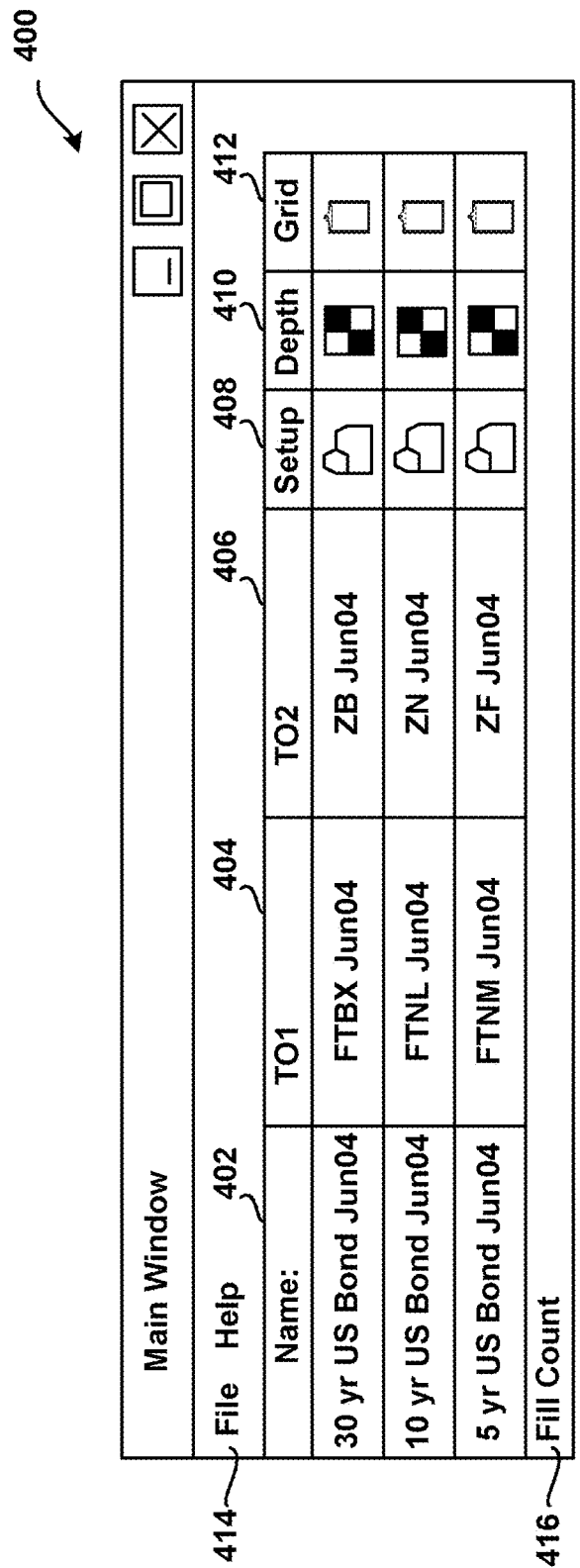
FIG. 4 is a block diagram illustrating an example configuration window that could be used to define tradeable object combination according to one example embodiment.

FIG. 4 is a block diagram illustrating an example configuration window 400 that a trader may use to define tradeable object combinations according to one example embodiment. The configuration window 400 can be used as the main control panel to manage and launch multiple tradeable objects combinations. According to one example embodiment, the configuration window 400 may be implemented on a grid created from any available software package that forms a spreadsheet like grid of rows and columns that intersect to form cells.

Preferably, tradeable objects can be added to the window 400 by selecting them from a market window. Selection means, as used herein, may include any menu-driven mechanisms (e.g., pull-down menus, drop-down menus, pop-up menus, and so on), command line entry mechanisms, check boxes that can be used to enable or disable one or more features or options, drag-and-drop, and other known selection methods. As shown in FIG. 4, the configuration window 400 provides a number of tradeable object columns: a "Name" column 402, "Tradeable Objects 1 and 2" columns 404 and 406, a "Setup" column 408, a "Depth" column 410, and a "Grid" column 412. The Name column 402 may provide any user-configurable alias name for a tradeable object combination. It should be understood that while the window 400 illustrates only a tradeable object combination including two tradeable objects, a trader could also select more than two tradeable objects for the combination. Also, more columns could be used, or multiple tradeable objects could be dropped into each cell of the tradeable object columns 404 and 406. Further, alternatively, only one column could be used, and a trader could drop multiple tradeable objects into that column. The Setup column 408 includes a number of selection icons, and a trader may launch a setup window for each tradeable object combination by selecting a respective icon. The Depth column 410 includes a number of icons that can be used to launch a depth window for the tradeable object combination, the examples of which will be illustrated in relation to Figures below. The Grid column 412 includes a number of icons that can be used to launch a grid window.

The configuration window 400 illustrates three tradeable object combinations. However, it should be understood that more than three combinations could be created as well. Also any new tradeable object can be added by creating another row below the last combination. In one embodiment, the configuration window 400 may be automatically resized to display up to a predetermined number of tradeable object combinations. For example, by default, the configuration window 400 could be setup to display up to 10 tradeable object combinations, and, if more than ten tradeable object combinations are added to a list, a scroll bar can be displayed so that a trader can view and access all tradeable object combinations. Also, a trader could open various configuration files, such as any previously saved configurations, by selecting a file icon 414.

In the example provided in relation to FIG. 4, each tradeable object combination consists of a pair of related tradeable objects, or the same tradeable objects being traded at two different exchanges. However, it should be understood that a trader can select any tradeable objects to be combined into a tradeable object combination of the example embodiments. The configuration window 400 also displays a fill count at the bottom of the screen. The fill count may represent the number of fills for all exchanges to which the trading application 206 is logged in, and the displayed number can be dynamically changed based on market information being received from each respective exchange. Alternatively, different fill counts could be shown as well, such as a number of fills for a plurality of exchanges.

It should be understood that a trader could save the most current tradeable object settings and formats of one or more workspaces so that, when the trader activates the Navigator™ application 208 in the future, the Navigator™ application 208 may load the selected workspace. Also, default settings could be applied to any new tradeable objects that are dropped onto the window 400.

FIG. 5 is a block diagram illustrating one example embodiment of a setup window 500. A trader may activate the setup window 500 by selecting one of the setup icons in the setup column 408 of the configuration window 400. Preferably, there is a single setup window associated with each pair or combination of tradeable objects, and properties specified for one tradeable object combination can be different than those specified for a different combination. The setup window 500 includes a number of fields that a trader may use to configure parameters for each combination of tradeable objects. The setup window 500 may include a group information field 502, which may display, for example, an alias associated with a tradeable object combination selected by a trader, such as Sep04 Eurodollar. Contract information fields 504 display names and abbreviated names of tradeable objects corresponding to the defined combination, such as CME-S: GE Sep04 and LIFFE-S: ED Sep04, along with the abbreviated names of GE and ED.

It should be understood that when a trader selects one of the setup icons 408 on the configuration window 400, the fields 502 and 504 can be automatically populated with the names of the tradeable objects corresponding to the selected setup icon. Also, it should be understood that the names used in each field could be user-configurable. The window 500 includes a plurality of quantity fields 506, including a maximum quantity field that can be used to specify a maximum quantity value that a trader will be allowed to enter for a particular tradeable object combination. A default quantity field defines a default quantity that will be automatically defined for any order that a user enters for a particular tradeable object combination. The Right-Click Quantity field defines an order quantity that will be entered for a combination of tradeable objects upon detecting a right click input in relation to the order entry columns corresponding to the tradeable object combination or individual tradeable objects.

Also, as shown in FIG. 5, a user could define a multiplier or a divider to be used in relation to quantities 512 and price levels 514 corresponding to each tradeable object. A user could select if a divider or a multiplier function will be used by the price and quantity equalizer engines by selecting desired boxes at 512 and 514. As mentioned earlier, the multiplier/divider functions allow a user to adjust the quantity values and price values corresponding to two or more tradeable objects. In one example embodiment, a trader could select one of the price axes corresponding to one of the tradeable objects to be used as a common axis of static prices. In such an embodiment, a multiplier and/or offset could be used to map the prices of the other tradeable object to the selected price axis. Alternatively, another axis could be created. In such an embodiment, different multipliers and/or offset can be applied to the two price axes corresponding to the two tradeable objects in order to position the tradeable object in relation to the newly created axis.

Also, a trader could define offset values to be used in relation to prices and quantity values corresponding to the tradeable objects, as shown at 516. A trader could interchangeably define different offsets for quantity and price levels by selecting a quantity box or a price box, defining the offset values, and then selecting the Apply selection icon. FIG. 5 illustrates three different offset types, a Global offset, a Bid offset, and an Ask offset. When the Global offset value is selected, it could be used across all price/quantity levels. Then, Ask and Bid offsets could be used to define different offsets in relation to bid and ask prices or quantities.

A trader can also use the setup window 500 to define quantity allocation rules to be applied when a trader submits orders to one or more exchanges via the trading interfaces of the example embodiments. The Navigator™ application 208 can use the configured rules to determine the allocation of order quantities between two or more tradeable objects corresponding to the defined tradeable object combination. In one example embodiment, a trader can define a plurality of rules, and the rules can be based on order types being entered by a trader. For example, as illustrated in FIG. 5, a trader can define two different sets of rules, one set for lifting orders, and another set for joining orders. In one example embodiment, a lifting order occurs when a buy order is entered at a price level where a resting sell order exists or at a price level that is better than that of the resting sell order, or when a sell order is entered at a price level where a resting buy order exists or at a price level that is better than that of the resting buy order. In turn, a joining order occurs when an order is entered and it is not a lifting order, i.e., there is no pending order quantity on the opposite side of the market. Therefore, a joining buy order occurs when a trader enters a buy order at a price level where either a resting buy order already exists, or at a price below both tradeable objects' lowest selling price levels. Also, a joining sell order occurs when a sell order is entered at a price level where either a resting sell order exists, or at a price level above both tradeable objects' highest buy prices.

In one example embodiment, if either a buy order or a sell order is entered at a price level where resting buy orders exist in only one tradeable object of the combination, and where resting sell orders exist in the other tradeable object, such that either lifting or joining logic could be applied, the Navigator™ application 208 may apply the lifting logic. In one embodiment, when the Navigator™ application 208 applies the lifting logic, it will not use the lifting logic for the available quantity and then the joining logic for the remaining quantity. However, different embodiments are possible as well, such that, for example, rather than applying the lifting logic when either the lifting or joining logic could be applicable, the Navigator™ application 208 could select the joining logic instead.

Referring to FIG. 5, a trader may configure a number of quantity allocation rules based on the type of an order, such as based on whether an order is a joining order or a lifting order. The rules for orders include a "Constant Percentage" rule, a Flatten Position First ("FPF") while accounting for better orders-"FPF (Account for Better Orders)," an "FPF (Account for Orders)," and an "FPF (Ignore Orders)." It should be understood that the rules illustrated in FIG. 5 are only examples, and more quantity allocation rules could be defined as well.

When the Constant Percentage rule is selected, the Navigator™ application 208 may allocate an order quantity to two or more tradeable objects based on the supplied percentages.

According to the example given in FIG. 5, the Navigator™ application 208 could allocate the entered quantity equally between two tradeable objects. If the percentages are selected and the calculations based on the defined percentages dictate that a quantity of 1 is to be split between the first tradeable object and the second tradeable object, a trader may set up a rule to allocate that quantity to a selected tradeable object, such as the first tradeable object. For example, if a trader places a request to buy 12 lots of a tradeable object combination associated with quantity allocation rules dictating that 70% of any entered quantity should be allocated to the first tradeable object, and the remaining 30% should be allocated to the second tradeable object, then the quantity of 8.4 would be allocated to the first tradeable object, and a quantity of 3.6 would be allocated to the second tradeable object based on the defined percentages. If the allocation rules are set so that the first tradeable object is the preferred quantity allocation tradeable object, then a quantity of 9 will be allocated to the first tradeable object, and a quantity of 3 will be allocated to the second tradeable object. Also, it should be understood that when an order quantity is allocated based on the defined percentages, only a single order can be sent to an exchange at any given point in time. Thus, a trader could define one or more priority rules defining which of the two orders will be sent first. Different embodiments are possible as well.

If the FPF (Account for Better Orders) rule is selected, the Navigator™ application 208 will attempt to flatten any net position while accounting for working orders at the better prices, referred to as "better orders," and then split the remaining quantity based on the defined percentages. For example, if a trader's net position in one tradeable object is –10 while there are already a working buy quantity of 3 pending at the better price level than an order being entered by a trader, the Navigator™ application 208 will attempt to flatten the net position based on the net position of –7. When the Navigator™ application 208 allocates an order quantity based on the trader's net position, and there is still a remaining order quantity, the Navigator™ application 208 will use the percentage rules.

Referring to the next rule, if the FPF (Account for Any Orders) is selected, the Navigator™ application 208 will attempt to flatten a trader's net position while accounting for any working orders, even if the existing working orders are at price levels that are worse than the new order to be entered. If there is any remaining order quantity, the Navigator™ application 208 will allocate the remaining order quantity using the percentage rules. According to the next rule, if the FPF (Ignore Orders) is selected, the Navigator™ application 208 will attempt to flatten the trader's net position while not taking into consideration any working orders.

FIG. 5 also illustrates a number of quantity allocation rules 510 for lifting orders. Using the first rule-"Optimize (FPF)," the Navigator™ application 208 may, in one embodiment, attempt to place an order at the best price. Then, the Navigator™ application 208 may attempt to allocate the order quantities so that the allocation will result in a reduction of a net position being held by a trader in relation to one or both tradeable objects. If there is any remaining order quantity, the Navigator™ application 208 can then start allocating the quantities based on any preset percentages. According to the second rule, "Optimize (Ignore Position)," the Navigator™ application 208 may still attempt to submit orders at the best price(s) first, while ignoring the trader's net position. Also, the Navigator™ application 208 may use the preset percentages when there is a remaining order quantity after the application 208 places one or more orders at the best price.

In FIG. 5, a third option that could be used for any lifting orders is a constant percentage option. If a trader selects this quantity allocation option, the Navigator™ application 208 will allocate a quantity specified by a trader between two or more tradeable objects according to the defined percentages. Also, if this option is selected, the Navigator™ application 208 will not attempt to reduce a trader's net position related to each tradeable object before using the quantity allocation percentages. Specific examples related to each order routing option will be given below.

IV. Example Interfaces For Trading Multiple Tradeable Objects

FIG. 6 is a block diagram illustrating a graphical user interface 600 for trading multiple tradeable objects in accordance with one example embodiment. The graphical user interface 600 includes a price axis 602. It should be understood that the axis 602 could also represent other values, such as yield or volatility rather than price. FIG. 6 illustrates the price axis 602 as a vertical column; however, different orientations of the price axis 602 could also be used, such as horizontal or at some other angles to create a three-dimensional effect, for example. The price axis 602 is of a static type, and is described in U.S. patent application entitled "Click Based Trading With Intuitive Grid Display of Market Depth," referenced above, the contents of which have been incorporated above by reference. Accordingly, the values in the price column are static. That is, they do not normally change position unless a re-centering, re-positioning, or other user initiated command (such as clicking on a scroll button) is received. The re-centering/re-positioning command is described more below.

The quantity values described in the bid and ask regions are dynamic. For example, they move up and down along the static axis to reflect market depth for the given tradeable object. So, for example, when a best available quantity moves up in price, quantities populate the appropriate price levels which using the preferred display shows that the best available quantity has just moved up. The same is true when the best available quantity moves down in price such that quantities populate the appropriate price level which shows that the best available quantity has just moved down. Additionally, quantity values displayed in the bid and ask regions are dynamic in the sense that the actual quantity itself may go up or down in magnitude at a particular price level. For example, assume that the best bid price was 60 which had a quantity of 375. Then, assume that the quantity was reduced to 325. Accordingly, the quantity displayed would reflect the new quantity value of 325, but the price of 60 would remain static.

In the embodiment illustrated in relation to FIG. 6, the trading interface 600 supports trading of two or more tradeable objects. When the trading interface 600 displays data related to different tradeable objects, the trading interface 600 may display names or abbreviations corresponding to the tradeable objects selected by a user, such as "ED" and "GE" displayed in relation to columns 604A-B and 606A-B, respectively. Alternatively, if a trader selects the same tradeable objects being traded at two different exchanges, the trading interface 600 can display exchange indicators with respect to each column. In another embodiment, if a trader selects the same tradeable objects having different expiration dates, the trading interface 600 can display the expiration dates corresponding to each tradeable object. However, it should be understood that any user-configurable indicators could also be displayed to distinguish between the data corresponding to two or more tradeable objects. It should be understood that indicators that are displayed in relation to the trading interface 600 may depend on the trader's preferences.

The trading interface 600 preferably presents at least a portion of order book information distributed by the host exchange(s). Thus, the trading interface 600 includes a first tradeable object bid quantity region 604A, a first tradeable object ask quantity region 604B, a second tradeable object bid quantity region 606A, and a second tradeable object ask quantity region 606B. In addition to displaying bids and asks for the individual tradeable objects, the trading interface 600 also includes a region that displays consolidated values for the tradeable objects. More specifically, a region 608A corresponds to the consolidated bid quantities, and a region 608B corresponds to the consolidated ask quantities. It should be understood that while FIG. 6 displays both, individual and consolidated regions, in an alternative embodiment, a user could select a different type of an interface. For example, a user may wish to use an interface that includes only consolidated quantity columns 608A and 608B, or only separate columns corresponding to bid and ask quantities for each tradeable object being traded by a trader, such as regions 604A-B and 606A-B. It should be understood that a user could also control layout and position of each bid/ask region in relation to the price axis 602. For example, a user could control the width of each column by selecting the vertical line on the right side of a header row corresponding to each column, and dragging it to the appropriate width. A user could also minimize a column by simply sliding the right hand side of the bar all the way to the left. The hidden columns could be redisplayed upon detecting a predetermined user input. For example, a user could right-click in relation to any displayed columns to activate a menu with a number of selection choices that could be used to change the layout of the trading interface 600.

In addition to displaying quantity related information, the trading interface 600 could also display other information. For example, the trading interface 600 displays a first indicator 610 denoting the highest traded price amongst the two tradeable objects, and a second indicator 612 denoting the lowest traded price of the two tradeable objects. It should be understood that different user-configurable indicators could also be used, and a user could define which traded prices should be taken into consideration when determining the highest and lowest traded prices for the indicators. The interface 600 could also indicate the last traded price by highlighting a cell corresponding to that price. Different colors could be used to indicate whether the price increased, decreased, or remained at the same level during a user-specified time period or compared to the previous last traded price.

The trading interface 600 could also display a combined last traded quantity and a combined last traded price. In one embodiment, when two or more tradeable objects of the combination trade at a specific price level, the quantities being traded may be added to the last traded quantity. When the price changes so that, for example, one of the tradeable objects trades at a different price level than the last traded price, the counter corresponding to quantities at that last traded price may be reset, so that when the orders are then again executed at that price, the last traded quantities can be added starting from the zero quantity level.

The trading interface 600 also includes one or more quantity indicator cells 614A and 614B. The quantity indicator cell 614A displays a default, static quantity value specified via the setup window 500. The quantity indicator cell 614B displays a quantity value that can be dynamically changing based on any user-configurable formula. In one example embodiment, the quantity indicator cell 614B can be linked to any other application, such as Excel, that a trader can use to define one or more equations to be used for calculating the quantity values. It should be understood that the equation(s) can be based on any user-defined parameters, such as any market-related parameters, trader-related parameters, trader risk-related parameters, or the combination thereof.

In one example embodiment, a trader can decide which of the two quantities will be used in relation to an order being entered via the trading interface 600. For example, a trader may deactivate one of the quantity cells. Alternatively, when a trader enters an order via one of the order entry regions, such as the bid quantity regions 604A-608A or the ask quantity regions 604B-608B, in this example, the trader may use different order entry inputs that could activate one of the quantity cells. For example, a right click in relation to one of the order entry regions could be used to activate the quantity indicator cell 614A such that the static quantity value could be used to set a quantity value for an order being entered via the trading interface. In such an embodiment, a left click in relation to one of the order entry regions could activate the quantity indicator cell 614B, and the dynamically determined quantity could be used in relation to an order. It should be understood that different activation methods could also be used in relation to the quantity cells.

Figure 7:
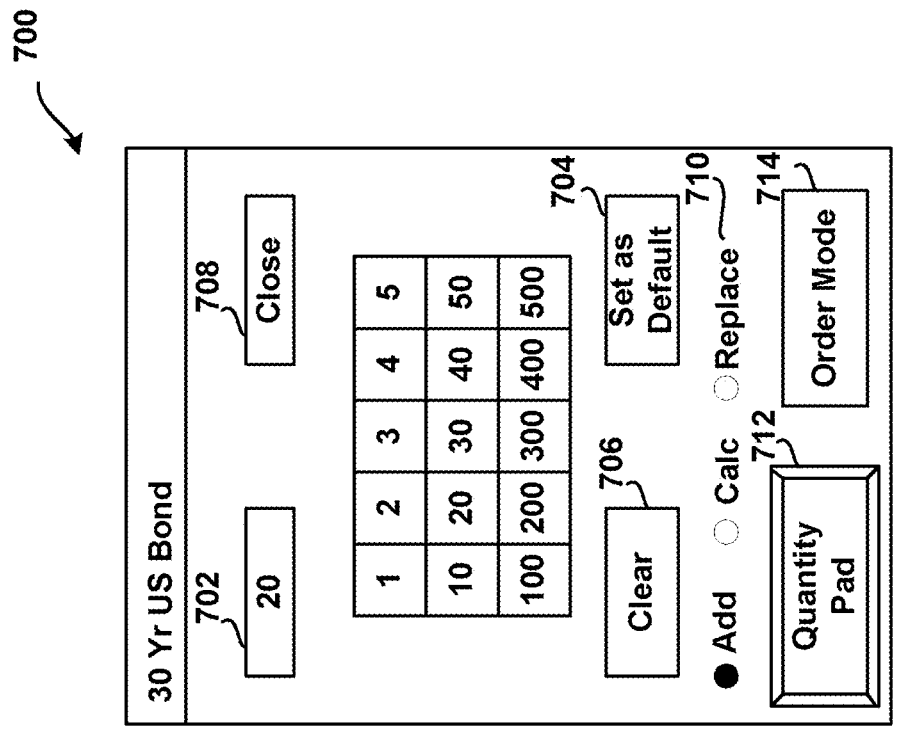
FIG. 7 is a block diagram illustrating an example quantity pad that could be used to enter order quantity.

A user can change the quantity value being displayed via the cell 614A by selecting and typing a new number in the cell, or clicking on the cell to activate a quantity pad. FIG. 7 is a block diagram illustrating an example quantity pad 700. The quantity pad 700 includes a quantity indicator 702 defining a default quantity value that will be used to set the quantity of any order. When a user enters a different quantity than that defined in the setup window 500, the user could set that quantity as a new default quantity by selecting a "Set as Default" selection icon 704. Then, when a user selects a "Clear" icon 706, the default quantity 702 will be reset to 0. While a user can change the quantity to any number, in one embodiment, the settable quantity value is preferably lower than the maximum quantity value specified in the setup window 500. In such an embodiment, if a new quantity value exceeds the specified maximum quantity value, the quantity of any order will be automatically set to the maximum quantity value.

The quantity pad 700 also provides a number of options 710 defining an action to be taken when a trader selects one of the numbers on the quantity pad. When a user selects an "Add" option, any quantity selected on the quantity pad will be added to another quantity subsequently selected on the pad. For example, if a user selects "1" and "2" and "3," the values will be added, and the quantity of 6 will be used in relation to any order until the quantity is reset. Upon selecting a "Calc" option, the selections made by a trader are treated as a string of values. For example, if a user selects "1" and "2" and "3," the quantity value will be set to "123." Finally, selecting a "Replace" option will replace the existing quantity with the newly selected value. For example, the result of pressing "1" and "2" and "3" will be "3." In the example shown in FIG. 7, the quantity pad 700 can be used in two modes, a quantity pad mode 712 and an order mode 714. If the quantity pad mode icon 712 is selected, the quantity pad 700 will be displayed. If the order mode icon 714 is selected, the quantity pad in the order mode will be displayed.

Figure 8:
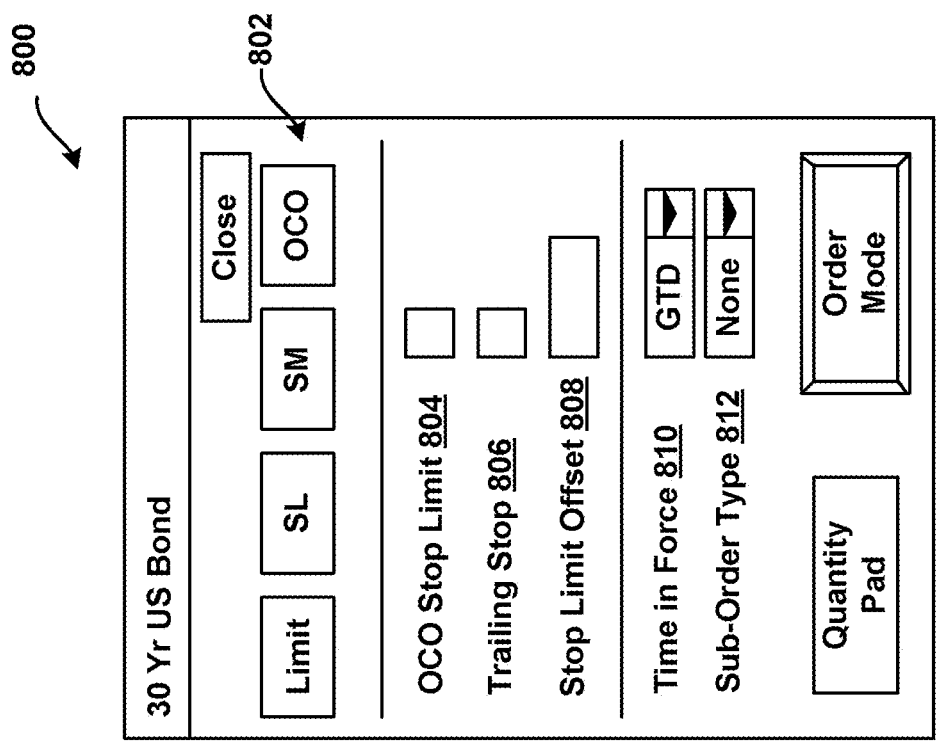
FIG. 8 is a block diagram illustrating an example quantity pad in an order mode.

FIG. 8 is a block diagram illustrating an example quantity pad 800 in an order type mode. The order type mode pad enables a trader to select a desired order type from a plurality of order type selection icons 802. The order types 802 include a limit order, a stop limit ("SL") order, a stop market ("SM") order, and an order cancel order ("OCO"). In one example embodiment, when one of the order type icons is selected, a cursor being displayed in relation to a trading interface will responsively change so that a user can easily tell what order type is being used. For example, an abbreviation of each order type can be periodically displayed in relation to the cursor so that when the stop market order icon is selected, letters "SM" can be displayed in relation to the cursor. However, it should be understood that different indicators of order types could also be used.

Whenever one of the order type icons is selected, a "Time in Force" field 810 and an "Order Sub-Type" field 812 can be enabled so that a trader can further define more parameters for each order type. Using the Time in Force field 810, a trader can designate a time period during which the order type will be kept active. According to a default setting, any selected order type can be a good till day ("GTD") order, so that any order that is entered by a trader will be continue working until the end of a current trading session. However, it should be understood that different options could be provided as well. For example, another selection option could include a good till cancel ("GTC") order, so that the order will be valid until a trader cancels an order or until a tradeable object expires. The Order Sub-Type option allows a trader to further define each order type. As illustrated in FIG. 8, the order sub-type field can be left blank so that no particular order sub-type will be used. Some of the order sub-types that could be selected by a trader could include a "Fill or Kill" or "Immediate or Cancel," as well as any other currently used or trader-configured order sub-types.

When a trader selects the stop limit order selection icon, the trader can submit a stop limit order, and can define additional order parameters via a Trailing Stop field 806, a Stop Limit Offset field 808, and a Time in Force field 810. The Trailing Stop field 806 allows a trader to set the stop order so that it trails with the market. In one embodiment, the trailing distance may equal a distance between a price level where the stop order was entered and a price level corresponding to the last traded price. However, different embodiments are possible as well, and the trailing distance could be user-configurable. The Stop Limit Offset field 808 allows a trader to set a number of ticks between the stop limit price and the stop entry price. When a trader selects the SM icon among the icons 802, the trader can submit a stop market order, and can further modify the stop market order using the trailing stop field 806 and the time in force field 810. Similarly to the stop limit order, a trailing distance for the stop market order can, by default, be set to a distance between a price level where a stop order was entered and a price level of the last traded price.

Upon detecting a selection of an OCO icon order type, a trader can submit an order cancels order combination (also referred to as "one cancels other"), and an OCO stop limit field 804, the trailing stop field 806, and the stop limit offset 808 will be enabled. The OCO stop limit field 804 can be used to designate if an order should be an OCO stop limit or stop market order, for example. By default, if a check box is not selected, the OCO order will be a stop market order. It should be understood that the OCO order can include a number of order combination options, so that a trader could submit two stop orders, two limits orders, or a combination of a limit order and a stop order.

In one example embodiment, rather than submitting a standard OCO including a limit order at one price level and a stop order at a second price level, a trader could submit an OCO for two different tradeable objects at the same price level. For example, a trader could enter such an OCO via the combined tradeable object columns. In such an embodiment, two orders corresponding to the entered order quantity could be sent to each respective exchange, and upon detecting one of the orders getting filled, the other order could be cancelled. If one of the orders is only partially filled, the order quantity corresponding to the second order could be responsively lowered to reflect the pending quantity of the partially filled order. A trader could also place an OCO via one of the market depth regions corresponding to the individual tradeable objects. When the Navigator™ application 208 detects an OCO being input via a market depth region corresponding to one of the tradeable objects, it will automatically place a second order for the other tradeable object, and may link the orders to be part of the entered OCO. Different embodiments are possible as well.

Figure 9:
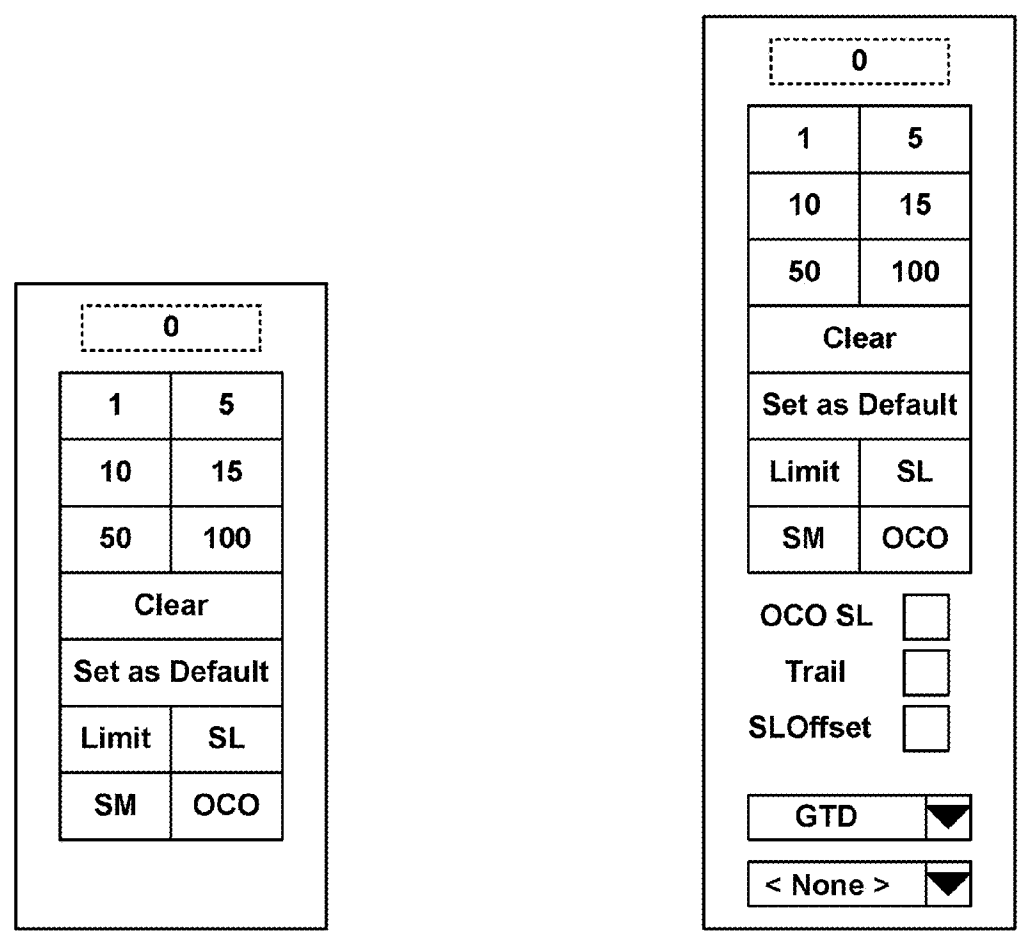

It should be understood that the quantity pad as well as the order type selection pad could be combined and the combination of the order quantity/order type pads could be displayed in relation to the trading interface of the example embodiments. Also, it should be understood that a trader could control the selection icons to be displayed in relation to the combined order quantity/type pad. FIG. 9 illustrates two different combined order/quantity pads. However, different embodiments are possible as well.

Referring back to FIG. 6, the trading interface 600 can also display net position information. In the embodiment illustrated in FIG. 6, net position information is displayed at the bottom of the trading interface and is duplicated on both sides of the price axis 602. The net position information includes a first net position indicator 616 for the first tradeable object, a second net position indicator 618 for the second tradeable object, and a consolidated net position indicator 620. In the example given in reference to FIG. 6, the first net position indicator 616 displays a net position of 10, the second net position indicator 618 displays a net position of −20, and the consolidated net position indicator 620 displays a consolidated value for the combination of the tradeable objects, which is −10 in this example. In one example embodiment, a user can click on any of the net position values to quickly populate the quantity field 614 with an absolute value of the selected net position value. For example, clicking on −20 will populate the quantity field with a quantity of 20. In one example embodiment, if the selected quantity is higher than the maximum quantity defined in the setup window 500, the quantity field 614 will be populated with the maximum quantity of the setup window.

The trading interface 600 also displays data related to working orders. In the example embodiment, working orders are displayed on the left hand side of the depth window in a working orders column 622. The working orders column 622 shows buy and sell working order quantities. If a buy order and a sell order are resting at the same price level, the working order column 622 will display an indicator, such as an "x," between the buy quantity and the sell quantity. However, different embodiments are possible as well to indicate quantities corresponding to buys and sells. In FIG. 6, the working order column 622 shows four working orders, two working sell orders 624, 626 at the price levels of 9790.0 and 9789.0, and a summation of two working buy orders 628 at the price level of 9784.0. The values corresponding to the working quantities or the cells that display working quantities can be color coded so that a trader could quickly distinguish a buy order working quantity from a sell order working quantity. The trading interface 600 also includes a total working quantity cell 630 that displays a total working quantity. In this example embodiment, the total working quantity is a buy working quantity of 10 and a sell working quantity of 20. Also, it should be understood that the working quantity indicators can be color coded to indicate if the working order quantity was split between two exchanges, or if the total order quantity was submitted to only one of the exchanges. Alternatively, if an order quantity was split between two exchanges, the working quantity column can show specific quantity values that were sent to each exchange. Also, two different working quantity columns could be created with one of them corresponding to a working bid order column, and another corresponding to a working ask order column.

It should be understood that a trader could right click on any working order indicator and could drag it to another location corresponding to a different price level. The action of dropping a working order indicator at a new price level will result in attempting to delete the order at the old price level and entering a new order at a new price level. Also, left clicking on a working order quantity may initiate a process of attempting to delete an order at one or more exchanges. If the working order quantity is associated with two or more orders pending at two or more exchanges, the user action will initiate the process of attempting to delete orders pending at the multiple exchanges, based on the quantity allocation rules that were used to allocate the quantities between two or more tradeable objects. The process of deleting an order may involve sending one or more messages including requests to delete one or more working orders from one or more exchanges. Similarly, an action of left clicking on the total working order quantity field 630 may initiate a process of attempting to delete all working orders being displayed via the trading interface. In one example embodiment, the sequence in which the orders are deleted may be based on their positions in the market. For example, orders closer to the inside market price can be deleted first before those which are farther away. Such an embodiment may be beneficial in fast moving markets since the chance of an order getting filled before it is deleted is lower. It should be understood that different user initiated actions from those of right clicking or left clicking could also be used to initiate the functionality described above as well as different functions.

The trading interface 600 may also display details corresponding to the last order submitted by a trader. In FIG. 6, the details related to the last order are displayed at 632. In the example embodiment, the order information defines an order type and an order quantity submitted for each tradeable object. More specifically, as illustrated in FIG. 6, the last submitted order was a join order and included an order to buy 5 lots of GE at the price level of 9784, and an order to buy 5 lots of ED at the price level of 97.84. It should be understood that the information corresponding to the last order could be displayed anywhere in relation to the trading interface 600.

Figure 10:
FIG. 10 is a block diagram illustrating an example order pane window for displaying order information associated with working orders.

A trader can also view an order pane that can be used to display any working orders pending at one or more exchange. FIG. 10 is a block diagram illustrating an example order pane window 1000. The order pane window 1000 shows working orders at each price level, and the order in which order information is displayed in the order pane window may depend on when the orders were sent to or were received at one or more exchanges. However, different embodiments are possible as well. In one embodiment, a trader could activate the order pane window 800 by clicking on one of the locations that displays working order quantities. When the order pane window 800 is activated, it may be displayed in relation to the trading interface, such as at the center corresponding to a working order indicator in relation to which the order pane window 800 was activated, or at some other location selected by a trader. In one example embodiment, the order pane window may display data related to a working order in relation to which the order pane window was activated. Alternatively, the order pane window 800 could display data corresponding to all working orders of the tradeable objects being traded via a trading interface in relation to which the order pane window was activated. It should be understood that different activation methods could also be used, and data being displayed via the order pane window 800 could be based on user configuration.

A trader could also use the data displayed via the order pane window 800 to change order parameters corresponding to each working order displayed via the order pane window. For example, a trader could change a price level or a quantity value corresponding to each working order. A trader could change the order quantity corresponding to each working order by clicking on the quantity corresponding to the specific working order and entering a desired quantity. Alternatively, different user inputs could be used to incrementally increase or decrease the displayed order quantity. In one embodiment, when a trader right-clicks or left-clicks on a working order quantity cell, the user actions may trigger the order quantity to be automatically increased or decreased by a predetermined amount, respectively. Alternatively, rather than changing an order parameter automatically upon detecting a user input, a confirmation icon could be displayed to a user in the order pane window 1000, such as "OK" in the Chg column 1018, and the user could select the OK icon to apply a change to the order parameter. If a user input is interpreted as a request to lower an order quantity for a working order, the trading application 206 may send a request to a respective exchange to delete a portion of an order. Alternatively, depending on the exchange settings, a request could be sent to delete the working order, and a new order with a modified order quantity may be submitted instead. Similar messages may be generated upon detecting a request to increase the order quantity. Also, a trader could delete any of the working orders displayed in the order pane window 1000, by selecting an indicator displayed in a cell of the Del column 1002 corresponding to an order to be deleted. Upon detecting a user input that is associated with a request to modify one or more order related parameters, the Navigator™ application 208 could communicate the changes to the trading application 206, and the trading application 206 could then generate and communicate any necessary requests to one or more electronic exchanges.

Referring to FIG. 10, the order pane 1000 includes a plurality of fields: a "Del" field 1002, a "Tradeable Object" field 1004, a Quantity ("Qty") field 1006, a Price Field 1008, a Stop Price field 1010, an Account Number ("Acct#") field 1012, an Order Type ("Type") field 1014, a Time Stamp field 1016, and a Change Indicator ("Chg") field 1018. According to one example embodiment, a user can configure different rules defining when the order pane window 1000 should be activated. For example, a user may want to have the order pane window 1000 activated immediately upon detecting a user selection means over one of the working orders indicators being displayed on the trading interface 600. Alternatively, the order pane window could be displayed after some predetermined time period upon detecting a trigger to activate the order pane window. It should be understood that the order pane window 1000 could be displayed upon detecting any user configurable input. Similarly, user inputs could be defined to trigger an action of hiding the order pane window 1000. Also, different fields could be displayed in relation to the order pane 1000, such as a trailing offset field, and one or more fields can be automatically hidden if there is no data to be displayed in relation to them.

Referring back to FIG. 6, a trader could also submit orders using the trading interface 600. The orders can be submitted using methods described in U.S. Pat. No. 6,772,132 and U.S. Pat. No. 7,127,424, referenced above. For example, orders may be submitted by clicking, such as using a mouse or other pointing device, within a region of the trading interface 600 at a level of the desired price being displayed on the price axis. In general, if a trader clicks on any cell in the bid columns displayed to the left of the price axis 602, the trader will enter a buy order. Then, if a trader clicks on any cell in the ask columns displayed to the right of the price axis 602, the trader will enter a sell order. However, different results are possible as well depending on the position of the columns in relation to the price axis 602.

In one example embodiment, if a trader clicks within any cell of the consolidated bid or sell regions, such as regions 608A and 608B in FIG. 6, the Navigator application 208 may use the order rules defined in the set up window 500 to allocate the order quantity between two or more tradeable objects. As explained in reference to the order quantity allocation rules, the Navigator application 208 may use one of the quantity allocation rules based on the type of an order to which a quantity allocation rule is to be applied. Regardless of which quantity allocation rule is applied, a user input selecting a cell in the consolidated bid quantity column 608A will result in entering one or more buy orders, and a user input selecting a cell in the consolidated ask quantity column 608B will result in entering one or more sell orders.

When a user input is detected in relation to one of the cells corresponding to the bid or ask regions of each individual tradeable object, the Navigator application 208 will not use the rules defined in the set up window 500, and orders will be entered for a single tradeable object depending on where the user makes his selection on the trading interface 600. For example, clicking on any cell in the bid region 606A will result in submitting a buy order for the tradeable object "GE," and clicking on any cell in the ask region 604B will result in submitting a sell order for the tradeable object "ED."

In one example embodiment, by default, all orders being submitted via the trading interface window 600 may be GTD limit orders. However, it should be understood that a trader could submit different order types by selecting a desired order type via the order pad. Also, a cursor being displayed in relation to the trading interface 600 could indicate an order type being used by a trader. As mentioned in earlier paragraphs, a cursor could display user-designated letters to indicate different order types. For example, letters SL, SM, or OCO could be used to designate a stop limit order, a stop market order, and an order cancel order, respectively. When a user selects an OCO order, a cursor could also change colors to indicate if a user is entering the first order or the second order corresponding to the OCO.

Figure 11:
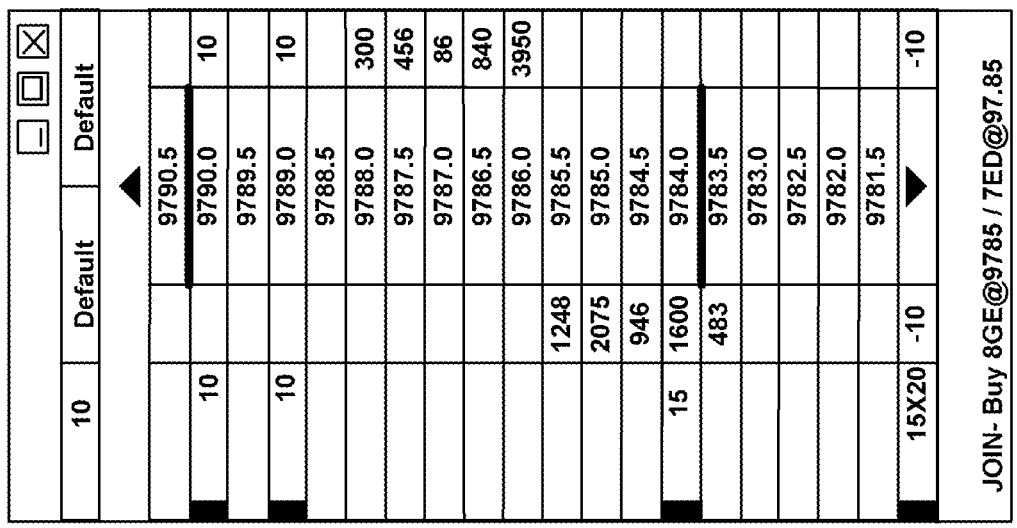
FIG. 11 is a block diagram illustrating a trading interface providing a consolidated market information display type.

As mentioned in earlier paragraphs, a user could modify the trading interface 600 according to the user's preferences. For example, a user may wish to view only the consolidated depth columns, rather than the combination of both, the consolidated and individual tradeable object columns. FIG. 11 is a block diagram illustrating a trading interface 1100 providing a consolidated market information display type. In one embodiment, a trader could activate the trading interface of this type by activating a pop-up menu and selecting a "consolidated only" selection choice. The pop-up interface could be activated upon detecting a predetermined user input, such as a right click in the area of the depth information columns, or some other input. Similarly, a trader may wish to modify the trading interface 600 so that it only includes depth columns corresponding to each individual tradeable object. FIG. 12 is a block diagram illustrating an example trading interface 1200 that provides a split tradeable object market information display type. It should be understood that the modified trading interfaces could include all elements described above with reference to FIG. 6.

FIG. 13 is a block diagram illustrating an example trading interface 1300 that displays market depth information for two different tradeable objects being traded in different tick sizes. The example trading interface 1300 includes a combination of consolidated market information columns 1302 and 1304, and separate columns 1306-1312 for each tradeable object. In the example embodiment, the trading interface 1300 displays market information related to two tradeable objects "FTBX" and "ZB." The tradeable object ZB trades in full ticks, while the tradeable object FTBX trades in half ticks. A difference in the granularity of the two tradeable object can be seen in relation to the individual tradeable object columns, such as the ask columns 1306 and 1310. In one example embodiment, a user could submit orders by clicking on cells associated with non-tradeable prices, such as a cell 1314 of the ask column 1310 corresponding to the tradeable object ZB. In such an embodiment, when a user clicks on a cell associated with a non-tradeable price, an order may be placed at a price level corresponding to the next tradeable price available for that tradeable object. For example, if a trader attempts to submit a sell order at one of the non-tradeable price levels in the ask quantity region 1310, such as 108075, the order may be placed at a better ask price, such as 108080. However, the price selection could be user configurable, and the order could alternatively be placed at 108070. Similar methods for selecting prices could apply to any buy orders being placed via the bid quantity region 1312.

Also, when an order for a combination of tradeable objects is placed so that it may result in a sweep of the market, and there are some price levels with no available quantities for one of the tradeable objects, a rule may be defined to send any possible lifting orders first, and then send one or more joining orders for the remaining order quantity. In such an embodiment, if there are quantities available for two tradeable objects at a single price level, the quantity allocation rules could be used to allocate the quantities between the tradeable objects, while taking all available quantity corresponding to a single tradeable object at the better price. For example, referring to FIG. 13, when an order to sell a quantity of 700 is entered at a price level of 108025, a quantity of 71 can be first lifted from the price level of 108045, then a quantity of 105 can be lifted from 108040, then the quantities can be allocated between the available quantities at the price level of 108035, then a quantity of 42 can be lifted from the price level of 108030. If there is still any remaining order quantity, it can be allocated between the tradeable objects at the price level of 108025. However, different embodiments could also be used based on the user preferences.

As shown in relation to FIG. 13, a trader may wish to view market information corresponding to two or more tradeable objects that trade using different tick intervals. In such an embodiment, the cells corresponding to the non-tradeable price levels will be unpopulated since there will be no quantities available at those price levels. To avoid showing empty spaces, a trader may wish to consolidate the price levels and their corresponding bid and ask quantities. If price consolidation is used, two or more price levels may be combined into a single "consolidated" price level, and the outstanding bid and ask quantities of the consolidated price levels may then be the sum of the outstanding quantities of the un-consolidated price levels that have been combined to form the consolidated price level. Using price consolidation, a trading screen may then display information from a greater number of price levels on the trading screen than it would be able if it did not use price consolidation. The methods and displays that can be used for price/quantity consolidation are described in U.S. patent application Ser. No. 10/304,248, now U.S. Pat. No.

7,577,602, entitled "Method and Interface for Consolidating Price Levels on a Trading Screen," filed on Nov. 26, 2002, the contents of which are fully incorporated herein by reference.

However, when the prices and the corresponding quantities are consolidated, some of the information that may be valuable to a trader will not be shown. For example, if two bid prices are consolidated, a trader will be able to see only the combined quantity corresponding to the consolidated prices, and will not be able to see how much of the shown quantity is actually at the better price than that shown. The similar limitation is present in relation to consolidated ask prices and quantities. When the prices and quantities are consolidated, it may be certainly advantageous for a trader to be able to tell what quantities are available at the better price levels than those shown so that the trader can better assess his potential profit or loss.

In one example embodiment, when the prices are consolidated on the bid side of the market, the prices and quantities may be rounded down, while the prices and quantities may be rounded up in relation to the ask side of the market. For example, if a tradeable object ticks in half-ticks, and the prices are consolidated to show full ticks, bid quantities corresponding to the price level of 1.5 may be consolidated with bid quantities at the price level of 1.0, and the bid quantities that were rounded down to the lower price level will correspond to the "better than best" bid quantities. Similarly, for example, if there are ask quantities at the price level of 2.5, they will be consolidated with ask quantities at the price level of 3.0, and the quantities that were rounded up to the higher ask price level will correspond to the "better than best" ask quantities.

In addition to determining better than best quantities based on the quantities being used for consolidation, better than best quantities can be based on other data as well. For example, an exchange may provide implied prices and quantities. Implied prices and quantities are derived from direct orders in a combination of outright markets and spreads or strategies. For example, orders in outright markets may imply orders (often referred to as an "implied in" orders) into a spread market, and orders in a spread market plus orders in an outright market may imply orders (often referred to as an "implied out" orders) into another outright market. Alternatively, rather than receiving implied prices and quantities from an electronic exchange, the implied values could be computed at a network entity other than an exchange using market data as well as other data. A system and method for determining implied market information has been described in U.S. patent application Ser. No. 10/403,374, entitled "System and Method for Determining Implied Market Information," filed on Mar. 31, 2003, the contents of which are fully incorporated herein by reference.

According to one example embodiment, a trading interface may provide an indicator in relation to the consolidated price levels to indicate that some of the quantities displayed in relation to the consolidated price levels may be at better prices than those shown. It should be understood that the indicators can take any user-configurable formats, ranging from graphical indicators to numerical indicators including actual numerical values of the better than best quantities.

FIG. 14 is a block diagram illustrating an example trading interface 1400 that shows better than best indicators in relation to consolidated market depth. The example trading interface 1400 shows consolidated market information of FIG. 13, where a consolidated price axis 1412 is formed by consolidating two price levels into one, with prices and quantities corresponding to bids being consolidated to the next lower price level, as shown at 1404, and with prices and quantities corresponding to asks being consolidated to the next higher price level, as shown at 1402. Regions 1406 and 1410 show "better than best" quantities displayed in locations associated with the corresponding price levels.

It should be understood that different indicator types could also be used, and the example embodiment are not limited to the format used in relation to FIG. 14. For example, rather than using numerical indicators, graphical indicators could be used instead, such as an asterisk, or any other user-defined indicators. In one example embodiment, the graphical indicators could be color-coded to indicate different quantity levels corresponding to specific "better than best" quantities. Also, if more than two price levels are consolidated, more than two better than best quantity values could be displayed in relation to a corresponding consolidated price level. For example, if three price levels are consolidated, each cell in the regions 1404 and 1410 could be divided to form two sub-cells, such that each sub-cell corresponds to the better than best price level and can display better than best quantities corresponding to those price levels. In general, the number of quantity values corresponding to better than best quantities is one less than the number of consolidated price levels. For example, if four prices levels are consolidated, three better than best quantity values can be displayed in relation to the consolidated price level.

Order Quantity Allocation Examples

As mentioned in earlier paragraphs, a user may define a plurality of quantity allocation rules for different order types. In one example embodiment, the quantity allocation rules and order types may be defined based on a price level at which a user places an order compared to the price levels of other orders pending in the market. For example, a user may define different types of rules depending on whether an order is a lifting order or a joining order. According to the example embodiments, a lifting order occurs when a buy order is entered at a price level where a resting sell order exists, or when a sell order is entered at a price level where a resting buy order exists. A joining order occurs when an order is not a lifting order. For example, a joining buy order occurs when a trader places an order at a price level where either a resting buy order exists, or at a price level below both tradeable objects' lowest selling prices. Similarly, a joining sell order occurs when a trader places an order at a price level where either a resting sell order exists, or above both tradeable objects' highest buy prices.

Figure 15:
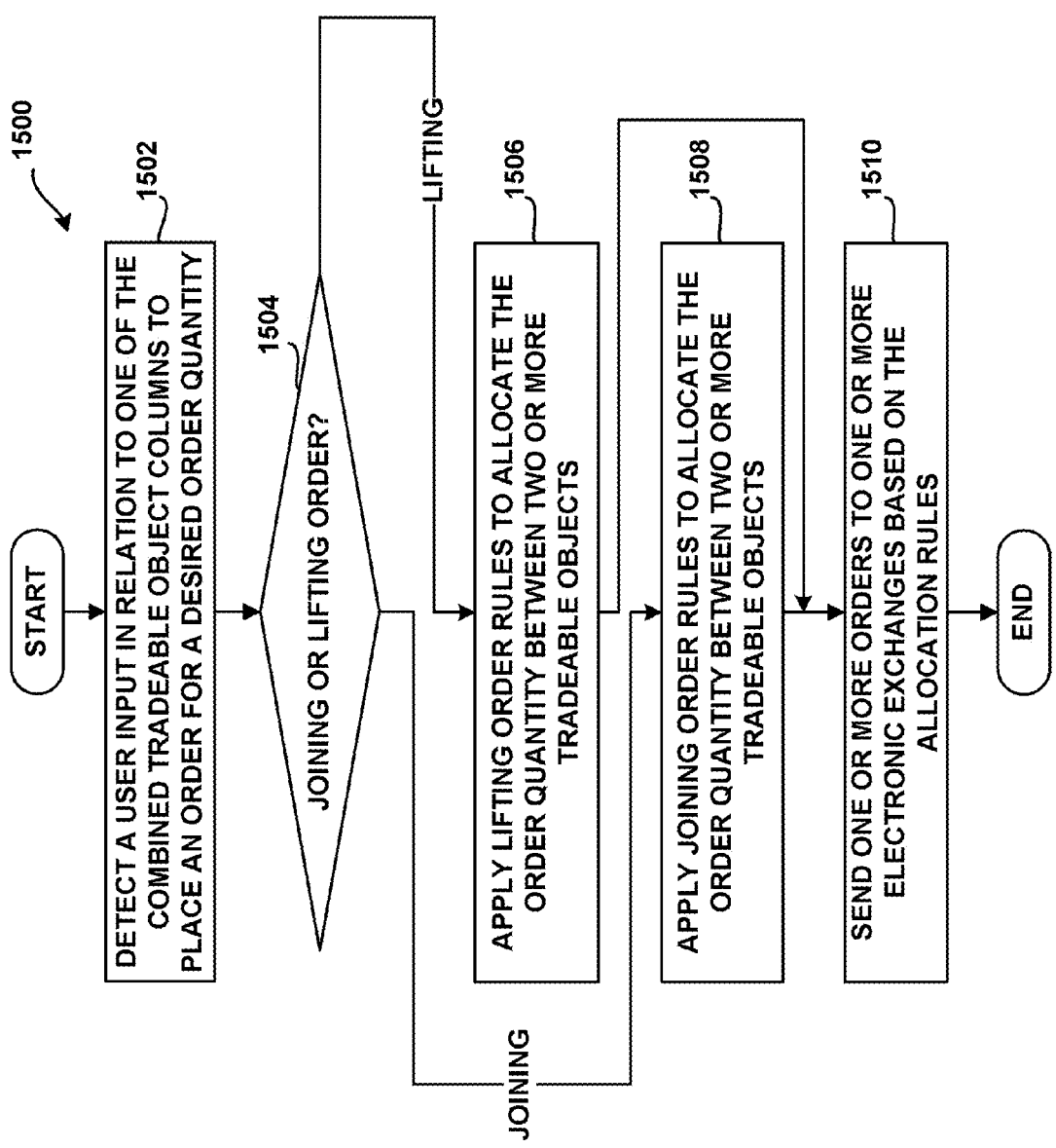
FIG. 15 is a flowchart illustrating an example method for setting order parameters based on an order type being input by a trader.

FIG. 15 is a flowchart describing an example method 1500 for setting order parameters based on an order type being input by a trader. It should be understood that each block may represent a module, segment, or portions of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. The flowchart 1500 will be described in relation to the elements of the client terminal in FIG. 2. However, it should be understood that more, fewer, or different components could also be used to execute the method 1500.

Referring to FIG. 14, at 1502, the Navigator™ application 208 detects a user input in relation to one of the combined tradeable object columns to place an order for a predetermined order quantity. For example, the Navigator™ application 208 may detect a user clicking on one of the locations of the combined columns of the trading interface, such as one of the locations of the combined columns 608A-B of the trading interface 600 described in reference to FIG. 6.

At step 1504, the Navigator™ application 208 determines if the entered order is a joining order or a lifting order. If the order is a lifting order, at step 1506, the Navigator™ application 208 applies lifting order rules to determine how the entered quantity should be allocated between two or more tradeable objects. Referring back to step 1504, if the Navigator™ application 208 determines that the order request corresponds to a joining order, at step 1508, the Navigator™ application 208 applies joining order rules to determine how the entered quantity should be allocated between two or more tradeable objects. In either case, the Navigator™ application 208 may then provide the quantity allocation data to the trading application 206, which may then responsively submit one or more orders to the electronic exchange(s) based on the provided quantity allocation data, as shown at 1510.

The subsequent examples will be used to describe different methods for allocating order quantities between two or more tradeable objects based on different order types and order allocation rules. The examples given below will refer to market depth data shown in FIG. 16. FIG. 16 is a block diagram illustrating a trading interface 1600 that displays market related information for two tradeable objects. The trading interface 1600 is a combined trading interface and includes market depth consolidated regions as well as market depth regions corresponding to the individual tradeable objects. More specifically, market depth bid regions include a market depth consolidated bid region 1604, and two bid regions 1606 and 1608 corresponding to market data of each individual tradeable objects. Then, market depth ask regions include a market depth consolidated ask region 1610, and two ask regions 1612 and 1614 corresponding to market data of each individual tradeable objects. The bid and ask regions are displayed in relation to a price axis 1602.

FIG. 17 is a block diagram illustrating a table 1700 that includes a plurality of quantity allocation values determined for a plurality of lifting orders based on optimization rules that ignore a trader's net position. When the Navigator™ application 208 uses the optimization rule that ignores a trader's net position, the Navigator™ application 208 will attempt to allocate the quantity to the best price. Also, if there is enough resting order quantity at the best price level for the two tradeable objects, the Navigator™ application 208 may use default percentages to determine how the breakdown will occur. Table 1700 includes a first tradeable object percentage (TO1%) field 1702 and a second tradeable object percentage (TO2%) field 1704 that define allocation percentages to be used for any quantity entered by a trader. The first and second tradeable objects in table 1700 correspond to FTNL and ZN in the trading interface 1600 of FIG. 16. Table 1700 also includes an order type field 1706 (Buy/Sell), a quantity field 1708 defining a desired order quantity, a price field 1710 defining an order price, and quantity allocation fields 1712 and 1714 illustrating how the Navigator™ application 208 would allocate the quantity to each tradeable object based on the quantity available in the market illustrated in FIG. 16.

The first five rows 1716-1724 of table 1700 define the quantity allocation percentages according to which 100% of the quantity should be allocated to the tradeable object. Referring to the first row 1716 in the table 1700, a buy order of 5 lots is entered at 111195. Because, based on the optimization rule, the Navigator™ application 208 will attempt to place an order at the best price level first before using any quantity allocation rules, the Navigator™ application 208 will ignore the allocation rules and attempt to first place a buy order of 5 lots for the second tradeable object TO2. It should be understood that the Navigator™ application 208 may communicate the quantity allocation data to the trading application 206, and the trading application 206 may responsively submit one or more orders to the electronic exchange(s). Similarly, the order quantity of 50 in the second row 1718 will be also allocated to the second tradeable object. Referring now to the third row 1720 in the table 1700, if a user wishes to buy 1000 lots of the combined tradeable objects at 111195, the Navigator™ application 208 will attempt to allocate the quantity of 582 to the second tradeable object (TO2), and then allocate the remaining quantity based on the rules. Therefore, in addition to the buy order at the best price, the Navigator™ application 208 will attempt to place a buy order for 418 lots for the first tradeable object.

As another example, if an order to buy 2000 lots is detected, the Navigator™ application 208 will allocate the quantity by placing an order to buy 582 lots of TO1 at 111195, since 111195 is the best available price. Then, the Navigator™ application 208 will use the allocation percentage rules to determine the allocation of the remaining quantity of 1718 at the next price level. Since there are only 583 lots of TO1 pending at 111200, the Navigator™ application 208 will place an order to buy 583 lots of TO1 at that price so that the maximum available quantity will be allocated to the TO1, and the remaining order quantity of 835 will be submitted to buy TO2 at 111200. Therefore, as shown in Table 1700, the total order quantity of 583 would be submitted for TO1, and the order quantity of 1417 would be submitted for TO2. The same method would be applied to allocate the order quantity of 3000 between the two tradeable objects, where a plurality of orders would be sent to buy 1099 lots of TO1, and 1901 lots of TO2.

Rows 1726-1734 in the second portion of Table 1700 correspond to quantity allocation rules, according to which an entered quantity will be equally divided between the two tradeable objects. Similarly to the earlier examples, the Navigator™ application 208 will attempt to buy at the best price before applying the allocation percentages. Referring to the row 1730, when the Navigator™ application 208 detects an order to buy 1,000 lots at 111195, the Navigator™ application 208 will attempt to place a first order for 582 lots of TO2, and then allocate the remaining quantity equally between the two tradeable objects at the price of 111200, i.e., 209 lots to each tradeable object. Therefore, as shown in Table 1700, an order to buy 209 lots of TO1 at the price level of 111195, and one order to buy 791 lots at 111195 will be submitted to the respective exchanges. The same methods can also be used to determine order quantity allocations for other orders shown in Table 1700.

The Navigator™ application 208 may also apply different optimization rules. Based on another optimization rule, the Navigator™ application 208 may attempt to place orders at the best price levels first. Then, if there is any remaining quantity, the Navigator™ application 208 may attempt to flatten any net positions being held by a trader in relation to the tradeable objects before applying any percentage allocation rules. FIG. 18 illustrates an example table 1800 that includes a plurality of quantity allocation examples for a number of lifting orders using optimization rules that take into account a trader's net position. Table 18 includes a plurality of columns, a TO1% column 1802, a TO2% column 1804, an Order Type column 1806, a Quantity column 1808, a Price column 1810, and Quantity allocation columns 1812 and 1814.

Referring to Table 18 in rows 1816 and 1818, if an order to buy 5 or 50 lots is detected, the Navigator™ application 208 will place an order to buy 5 or 50 lots of TO2, since there is enough pending quantity for TO2 at the best available price of 111195. Then, if an order to buy 1,000 lots is detected, the Navigator™ application 208 will place an order to buy 582 lots of TO2, since a quantity of 582 is the maximum order quantity available at the best price. The Navigator™ application 208 will then allocate the remaining quantity between the tradeable objects based on the allocation percentages defined by a trader. Based on the allocation percentages and a rule to flatten a net position first, the Navigator™ application 208 will allocate 100% of the remaining quantity to TO1, thus, resulting in the total allocation of 418 lots to TO1 and 582 lots to TO2, as shown at 1820.

The quantity of 2000 lots and 3000 lots would be allocated in the similar manner, with the final quantity allocations shown at 1822 and 1824. In the lower half of Table 1800, the allocation percentages are set to 50% for each tradeable object, and the allocation quantity values are shown for 5, 50, 1000, 2000, and 3000 lots respectively at 1826-1834.

FIG. 19 illustrates an example table 1900 that includes a plurality of example quantity allocations for a plurality of lifting orders based on constant percentage rules. Using the constant percentage rules, the Navigator™ application 208 will attempt to allocate an entered quantity based on the supplied percentages. Using this quantity allocation option, the Navigator™ application 208 will ignore the trader's current position in each tradeable object as well as any resting available orders. Table 1800 includes the same set of table columns 1902-1914 as those described in the tables above. The top five rows 1916-1924 of Table 1900 correspond to the percentage allocation rules according to which 100% of any quantity entered by a trader will be allocated to the first tradeable object. The bottom half of Table 1900 corresponds to the quantity allocation rules where one half of any entered quantity will be allocated to the first tradeable object, while the remaining half will be allocated to the second tradeable object. It should be understood that in some cases, such as when a quantity of 5 is to be equally divided between two tradeable objects, the Navigator™ application 208 may use one or more user-predefined rules to determine how to allocate an odd number of lots, such as one lot in this example, between the tradeable objects. In the example provided in Table 1900 at 1926, the odd quantity value will be allocated to the first tradeable object, thus, resulting in the quantity allocation of 3 lots to the first tradeable object, and 2 lots to the second tradeable object.

FIG. 20 illustrates an example table 2000 that includes a plurality of quantity allocation examples for a number of joining orders using constant percentage rules. In the example embodiment of FIG. 20, the Navigator™ application 208 will break down an order quantity associated with any joining order based on the supplied percentages. Table 2000 includes a plurality of columns 2002-2014, the types of which have been described in reference to the preceding figures. In the example shown in Table 20, the first five rows 2016-2024, correspond to the percentage allocation rule, according to which, 100% of any entered quantity will be allocated to the first tradeable object. Then, the next five rows of Table 20 correspond to the examples where any entered quantity is equally divided between two tradeable objects, with the priority given to the first tradeable object in cases where an odd quantity value cannot be allocated between the two tradeable objects.

It should be understood that the quantity allocation rules described above are only examples, and more, fewer, or different rules could be defined as well. Also, the rules could take many different formats and are not limited to defining percentages. For example, the quantity allocation rules could be based on any user-defined formulas, and the formulas could dynamically change based on market conditions. In one embodiment, the quantity allocation rules could be dynamically changed upon detecting that an exchange is unavailable. For example, if a tradeable object combination includes two tradeable objects being traded at two different exchanges, the Navigator™ application 208 could stop allocating any quantity to a tradeable object being traded at an unavailable exchange. Alternatively, the Navigator™ application 208 could modify the quantity allocation rules so that the entire order quantity associated with an entered order will be allocated to a tradeable object associated with an active exchange. Further, alternatively, in an embodiment where at least some of the entered quantity is to be allocated to a tradeable object associated with an unavailable exchange, the Navigator™ application 208 could block the order entirely, and not allocate any quantity corresponding to a tradeable object associated with an available exchange to a different tradeable object. It should be understood that an action taken by the Navigator™ application 208 upon detecting that an exchange is unavailable may be user configurable. Also, it should be understood that different modifications of the quantity allocation rules are possible as well.

In addition to modifying quantity allocation rules, the Navigator™ application 208 could also alert a user that one of the exchanges is unavailable. An alert signal could take many different formats, and could be an audio signal, a graphical signal, or a combination thereof. In one embodiment, an alert could be provided via a trading interface, such as the one illustrated in FIG. 6. For example, upon detecting that an exchange is unavailable, a color being used in relation to market depth regions associated with a tradeable object being traded at an unavailable exchange could be automatically changed to any user-defined color. Alternatively, the market depth regions could start flashing, or a message could be displayed via a trading interface, such as in a status pane of the trading interface. It should be understood that different alerts could be used as well.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for trading multiple tradeable objects in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for trading multiple tradeable objects in an electronic trading environment, the method comprising:

displaying an order entry region having a plurality of axially aligned locations via a computing device, each location corresponding to a price level and being adapted for receiving a user command;

receiving, via the computing device, command to trade a quantity according to a selection of at least one location of the plurality of axially aligned locations;

in response to the command, allocating, via the computing device, the quantity between any of a first tradeable object, a second tradeable object, and both the first tradeable object and the second tradeable object according to at least one quantity allocation rule, where the first tradeable object is different than the second tradeable object;

initiating submission of a trade order for at least one of the first tradeable object and the second trade object for trading via the computing device;

displaying, via the computing device, a first combined quantity indicator at a first location of the plurality of axially aligned locations, the first combined quantity indicator representing a buy quantity associated with a first buy order for the first tradeable object and a second buy order for the second tradeable object; and displaying, via the computing device, a second combined quantity indicator at a second location of the plurality of axially aligned locations, the second combined quantity indicator representing a sell quantity associated with a first sell order for the first tradeable object and a second sell order for the second tradeable object.

2. The method of claim 1 where the at least one quantity allocation rule is based on determining whether the trade order is lifting or joining.

3. The method of claim 1 where the quantity is allocated between any of the first tradeable object, the second tradeable object, and both the first tradeable object and the second tradeable object according to at least one quantity allocation rule of a plurality of quantity allocation rules, the plurality of quantity allocation rules comprises any of a first rule for lifting, a second rule for joining, a percentage allocation rule for a percentage between the at least two tradeable objects, a quantity allocation rule for allocating the quantity based on a trader's net position, and combinations thereof.

4. The method of claim 3, further comprising receiving a user selection for at least one of the plurality of quantity allocation rules.

5. The method of claim 3, further comprising selecting the at least one of the plurality of quantity allocation rules in response to detecting a user-defined condition.

6. The method of claim 1 where the at least one quantity allocation rule is adapted to allocate at least a portion of the quantity to flatten a trader's net position, and another quantity allocation rule is adapted to allocate a remaining portion of the quantity.

7. The method claim 1, where the at least one quantity allocation rule is adapted to allocate the quantity to flatten a trader's net position and accounting for the trader's working orders.

8. The method of claim 1, where the at least one quantity allocation rule is adapted to allocate the quantity according to available order quantities pending at a best available price.

9. A non-transitory computer readable medium having program instructions stored thereon, which when executed by a processor, cause the processor to execute acts comprising:

displaying an order entry region having a plurality of axially aligned locations, each location corresponding to a price level and being adapted for receiving a user command;

receiving a command to trade a quantity according to a selection of at least one location of the plurality of axially aligned locations;

in response to the command, allocating the quantity between any of a first tradeable object, a second tradeable object, and both the first tradeable object and the second tradeable object according to at least one quantity allocation rule, where the first tradeable object is different than the second tradeable object;

initiating submission of a trade order for at least one of the first tradeable object and the second trade object for trading;

displaying a first combined quantity indicator at a first location of the plurality of axially aligned locations, the first combined quantity indicator representing a buy quantity associated with a first buy order for the first tradeable object and a second buy order for the second tradeable object; and displaying a second combined quantity indicator at second location a of the plurality of axially aligned locations, the second combined quantity indicator representing a sell quantity associated with a first sell order for the first tradeable object and a second sell order for the second tradeable object.

10. The computer readable medium of claim 9 where the at least one quantity allocation rule is based on determining whether the trade order is lifting or joining.

11. The computer readable medium of claim 9 where the quantity is allocated between any of the first tradeable object, the second tradeable object, and both the first tradeable object and the second tradeable object according to at least one quantity allocation rule of a plurality of quantity allocation rules, the plurality of quantity allocation rules comprises any of a first rule for lifting, a second rule for joining, a percentage allocation rule for a percentage between the at least two tradeable objects, a quantity allocation rule for allocating the quantity based on a trader's net position, and combinations thereof.

12. The computer readable medium of claim 11, where the acts further comprise receiving a user selection for at least one of the plurality of quantity allocation rules.

13. The computer readable medium of claim 11, where the acts further comprise selecting the at least one of the plurality of quantity allocation rules in response to detecting a user-defined condition.

14. The computer readable medium of claim 9 where the at least one quantity allocation rule is adapted to allocate at least a portion of the quantity to flatten a trader's net position, and another quantity allocation rule is adapted to allocate a remaining portion of the quantity.

15. The computer readable medium claim 9, where the at least one quantity allocation rule is adapted to allocate the quantity to flatten a trader's net position and accounting for the trader's working orders.

16. The computer readable medium of claim 9, where the at least one quantity allocation rule is adapted to allocate the quantity according to available order quantities pending at a best available price.

17. A trading terminal configured to administer trading of tradeable objects, comprising:

a display device adapted to display a user interaction region having a plurality of axially aligned locations, each location being adapted to receive a user command for a price level, where the user interaction region includes a first combined quantity indicator at a first location of the plurality of axially aligned locations, the first combined quantity indicator representing a buy quantity associated with a first buy order for a first tradeable object and a second buy order for a second tradeable object, and a second combined quantity indicator at a second location of the plurality of axially aligned locations, the second combined quantity indicator representing a sell quantity associated with a first sell order for the first tradeable object and a second sell order for the second tradeable object;

a rules allocator configured to apply at least one quantity allocation rule for allocating an order quantity between a first quantity for the first tradeable object and the second quantity for a second tradeable object, the first tradeable object being different than the second tradeable object; and an order router configured to submit a first order for the first quantity of the first tradeable object and a second order for the second quantity of the second tradeable object in response to a detecting a selection of one the locations, the first quantity for the first tradeable object and the second quantity for the second tradeable object being determined according to the at least one quantity allocation rule.

\* \* \* \* \*